US012563285B2

(12) United States Patent (10) Patent No.: US 12,563,285 B2
Liu (45) Date of Patent: Feb. 24, 2026

(54) DISPLAY CONTROL METHOD AND APPARATUS, ELECTRONIC DEVICE, AND MEDIUM

(71) Applicant: VIVO MOBILE COMMUNICATION CO., LTD., Guangdong (CN)

(72) Inventor: Kun Liu, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 315 days.

(21) Appl. No.: 18/345,888

(22) Filed: Jun. 30, 2023

(65) Prior Publication Data

US 2023/0345113 A1      Oct. 26, 2023

Related U.S. Application Data

(63) Continuation of application No. PCT/CN2021/140761, filed on Dec. 23, 2021.

(30) Foreign Application Priority Data

Dec. 30, 2020    (CN) .......................... 202011607684.3

(51) Int. Cl.
    *H04N 23/63*        (2023.01)
    *G06F 3/0488*        (2022.01)
(52) U.S. Cl.
    CPC ......... *H04N 23/632* (2023.01); *H04N 23/633* (2023.01); *G06F 3/0488* (2013.01)
(58) Field of Classification Search
    CPC .................................................. H04N 23/632
    See application file for complete search history.

(56) References Cited

U.S. PATENT DOCUMENTS

| | | | | |
|---|---|---|---|---|
| 8,189,880 | B2 * | 5/2012 | Wen | ........................ G06F 16/51 |
| | | | | 382/118 |
| 9,852,325 | B2 * | 12/2017 | Sasaki | ................. G06F 16/5838 |
| 11,500,533 | B2 * | 11/2022 | Yun | ...................... H04N 23/667 |
| 2008/0239132 | A1 | 10/2008 | Kohama | |
| 2011/0050956 | A1 | 3/2011 | Bessho | |

(Continued)

FOREIGN PATENT DOCUMENTS

| | | |
|---|---|---|
| CN | 110401766 A | 11/2019 |
| CN | 111050076 A | 4/2020 |

(Continued)

OTHER PUBLICATIONS

Kaminaga Tomomi; Image Retrieval Device, Image Retrieval Method, and Camera; JP-2011257979-A; Dec. 22, 2011; English Translation; pp. 1-14 (Year: 2011).*

(Continued)

*Primary Examiner* — Cynthia Segura
(74) *Attorney, Agent, or Firm* — Price Heneveld LLP

(57) ABSTRACT

This application discloses a display control method and apparatus, an electronic device, and a medium. The method includes: displaying a first sign on a photographing preview interface, where the first sign indicates a target album associated with a target person in a first image, and the first image is a preview image displayed on the photographing preview interface; receiving a first input that is performed on the first sign by a user; and displaying an album preview interface of the target album in response to the first input.

9 Claims, 15 Drawing Sheets

(56) References Cited

U.S. PATENT DOCUMENTS

| | | | |
|---|---|---|---|
| 2013/0239057 A1* | 9/2013 | Ubillos | G06F 3/04842 |
| | | | 715/833 |
| 2015/0172534 A1* | 6/2015 | Miyakawa | G06F 3/04847 |
| | | | 348/222.1 |
| 2015/0358584 A1 | 12/2015 | Mattson | |
| 2016/0044234 A1* | 2/2016 | Huang | H04N 23/632 |
| | | | 348/222.1 |
| 2016/0073034 A1* | 3/2016 | Mukherjee | H04N 23/63 |
| | | | 348/333.11 |
| 2016/0300101 A1 | 10/2016 | Yu et al. | |
| 2017/0048461 A1* | 2/2017 | Lee | H04N 23/62 |
| 2017/0140249 A1* | 5/2017 | Lee | G06T 11/60 |
| 2017/0310888 A1 | 10/2017 | Wright et al. | |
| 2017/0332008 A1 | 11/2017 | Tsuchiya et al. | |
| 2017/0359505 A1* | 12/2017 | Manzari | H04N 23/65 |
| 2020/0014844 A1* | 1/2020 | Kasa | H04N 23/661 |
| 2020/0082599 A1* | 3/2020 | Manzari | H04N 23/667 |
| 2020/0279422 A1* | 9/2020 | Yamada | G06T 11/60 |
| 2020/0382724 A1* | 12/2020 | Pena | G06F 3/04883 |
| 2021/0081093 A1* | 3/2021 | Yun | G06F 3/0484 |
| 2022/0321795 A1 | 10/2022 | Jiang et al. | |
| 2024/0223840 A1* | 7/2024 | Han | H04N 21/4223 |

FOREIGN PATENT DOCUMENTS

| | | | | |
|---|---|---|---|---|
| CN | 111159449 A | 5/2020 | | |
| CN | 111371999 A | 7/2020 | | |
| CN | 111669462 A | 9/2020 | | |
| CN | 112148185 A | 12/2020 | | |
| CN | 112714257 A | 4/2021 | | |
| JP | 2008245055 A | 10/2008 | | |
| JP | 2011257979 A * | 12/2011 | | G06F 17/30 |
| WO | 2016088840 A1 | 6/2016 | | |
| WO | 2018055617 A1 | 3/2018 | | |
| WO | 2020134891 A1 | 7/2020 | | |

OTHER PUBLICATIONS

International Search Report and Written Opinion of the International Searching Authority dated Mar. 14, 2022 as received in Application No. PCT/CN2021/140761.

* cited by examiner

31

DISPLAY CONTROL METHOD AND APPARATUS, ELECTRONIC DEVICE, AND MEDIUM

CROSS-REFERENCE TO RELATED APPLICATIONS

This application is a continuation application of PCT International Application No. PCT/CN2021/140761 filed on Dec. 23, 2021, which claims priority to Chinese Patent Application No. 202011607684.3 filed in China on Dec. 30, 2020, which are incorporated in their entireties by reference herein.

TECHNICAL FIELD

This application pertains to the field of image display technologies, and specifically relates to a display control method and apparatus, an electronic device, and a medium.

BACKGROUND

With the development of electronic technologies, there are increasingly more types of functions that can be implemented on an electronic device. A current electronic device generally has a photographing function, and can intelligently classify images. In an implementation process of this application, the inventor finds that there is at least the following problem in the prior art: Currently, when a photographing preview interface is displayed, a user needs to manually perform multiple operations to enter different types of albums. It can be learned that currently, when the photographing preview interface is displayed, operation steps of entering different types of albums are complex.

SUMMARY

An objective of embodiments of this application is to provide a display control method and apparatus, an electronic device, and a medium.

According to a first aspect, an embodiment of this application provides a display control method, and the method includes:

displaying a first sign on a photographing preview interface, where the first sign indicates a target album associated with a target person in a first image, and the first image is a preview image displayed on the photographing preview interface;

receiving a first input that is performed on the first sign by a user; and displaying an album preview interface of the target album in response to the first input; where the target album includes at least one second image, and a person in the second image matches the target person.

According to a second aspect, an embodiment of this application provides a display control apparatus, and the apparatus includes:

a first displaying module, configured to display a first sign on a photographing preview interface, where the first sign indicates a target album associated with a target person in a first image, and the first image is a preview image displayed on the photographing preview interface;

a first receiving module, configured to receive a first input that is performed on the first sign by a user; and a second displaying module, configured to display an album preview interface of the target album in response to the first input; where the target album includes at least one second image, and a person in the second image matches the target person.

According to a third aspect, an embodiment of this application provides an electronic device. The electronic device includes a processor, a memory, and a program or an instruction that is stored in the memory and that can run on the processor, and when the program or the instruction is executed by the processor, steps in the method described in the first aspect are implemented.

According to a fourth aspect, an embodiment of this application provides a readable storage medium. The readable storage medium stores a program or an instruction, and when the program or the instruction is executed by the processor, steps in the method described in the first aspect are implemented.

According to a fifth aspect, an embodiment of this application provides a chip. The chip includes a processor and a communication interface, the communication interface is coupled to the processor, and the processor is configured to run a program or an instruction to implement the method described in the first aspect.

According to a sixth aspect, a computer program product is provided. The computer program product is stored in a non-volatile storage medium, and the computer program product is executed by at least one processor to implement the method described in the first aspect.

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

With reference to the accompanying drawings, a display control method and an electronic device provided in the embodiments of this application are described in detail below by using a specific embodiment and an application scenario thereof.

Figure 1:
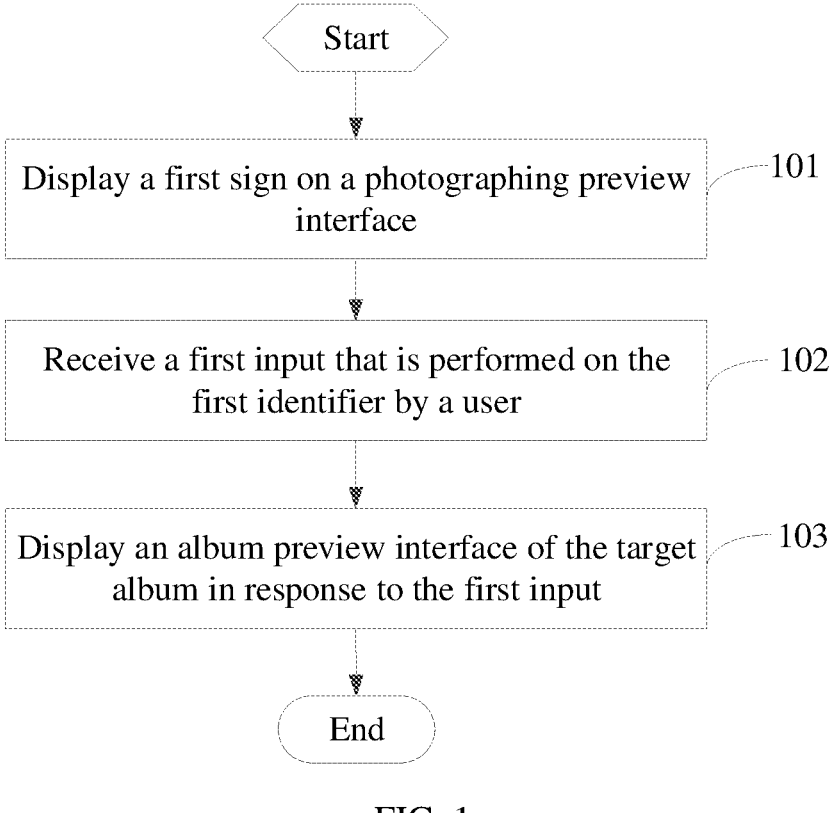
FIG. 1 is a flowchart of a display control method according to an embodiment of this application.

FIG. 1 is a flowchart of a display control method according to an embodiment of this application. As shown in FIG. 1, the method includes the following steps:

Step 101: Display a first sign on a photographing preview interface, where the first sign indicates a target album associated with a target person in a first image, and the first image is a preview image displayed on the photographing preview interface.

The sign in this application is text, a symbol, an image, and the like used to indicate information. A control or another container may be used as a carrier for displaying the information, and the sign includes but is not limited to a character sign, a symbol sign, and an image sign.

Figure 2:
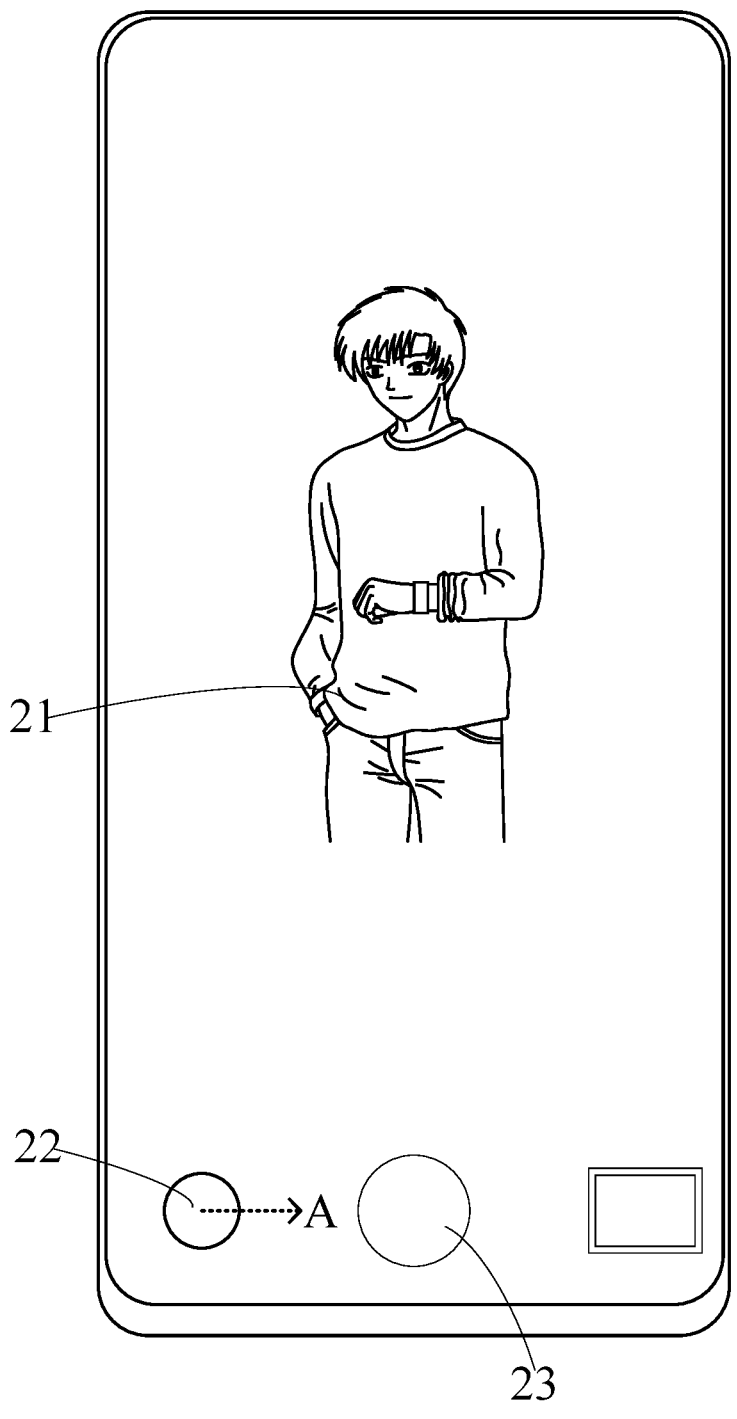
FIG. 2 is a first schematic diagram of a display interface in a display control method according to an embodiment of this application.
Figure 6:
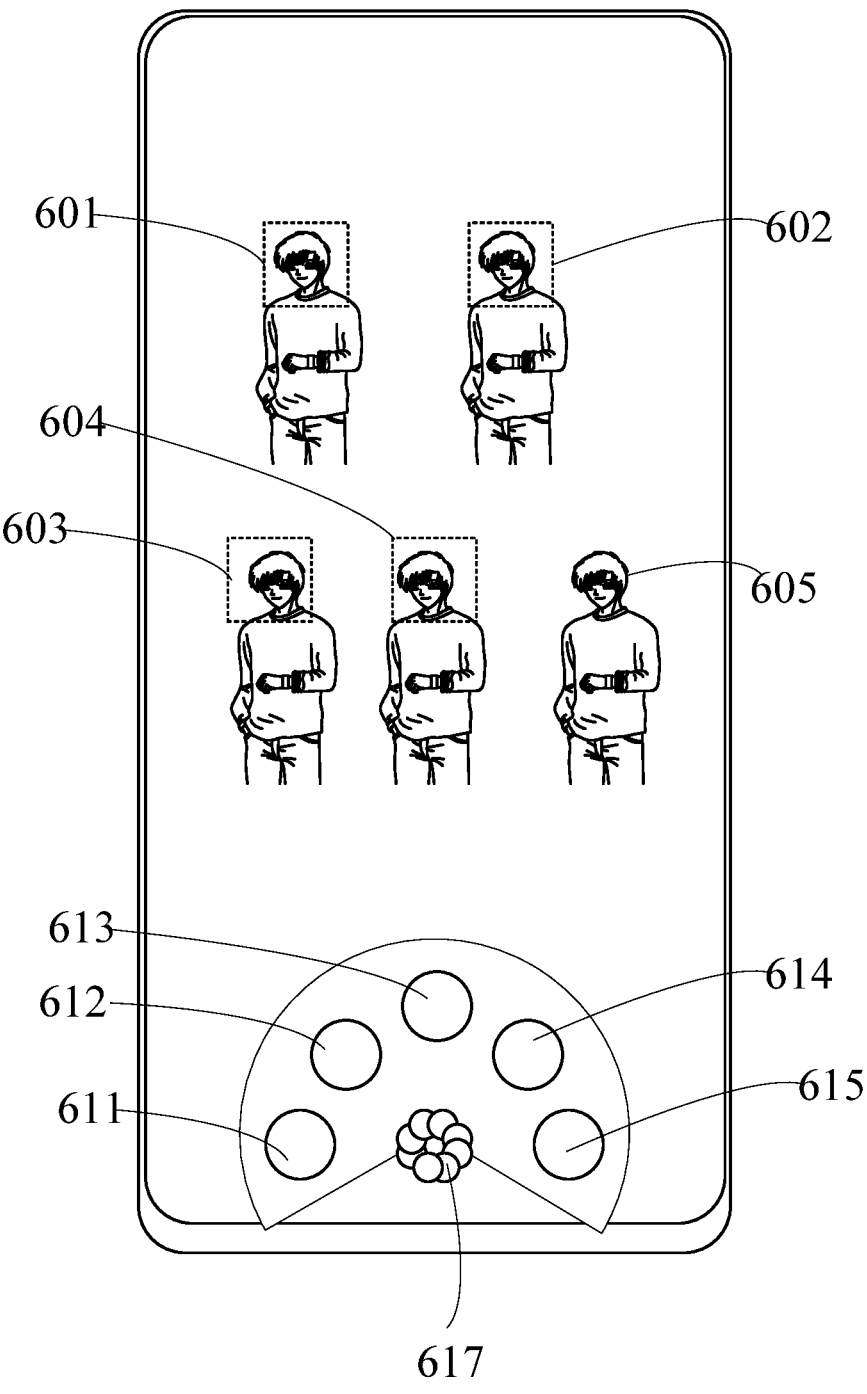
FIG. 6 is a fifth schematic diagram of a display interface in a display control method according to an embodiment of this application.

The photographing preview interface is a display interface of the first image which is captured by a camera, and the first image may include at least one person. For example, as shown in FIG. 2, a first image in FIG. 2 may include a person 21; and as shown in FIG. 6, a first image in FIG. 6 may include five persons: a person 601, a person 602, a person 603, a person 604, and a person 605. It should be noted that the foregoing person may also be understood as the target person in this embodiment of this application. The camera may be at least one of a front-facing camera or a rear-facing camera of an electronic device, and a specific location of the camera is not limited herein.

The type of the first sign is not specifically limited herein. For example, display content of the first sign may match display content of a target image, and a person included in the display content of the target image may match the target person in the first image. Further, the face of a person included in the target image may match the face of the target person in the first image. In addition, as shown in FIG. 2, FIG. 2 may further include a first sign 22 and a photographing control 23.

It should be noted that initial display content of the first sign may also be different from the target person in the first image. After the photographing preview interface is displayed and the initial display content of the first sign is displayed, the display content of the first sign may be updated to content that matches the target person included in the first image.

In addition, the display content of the first sign may also include text information. The text information may be used to describe feature information of the target person. For example, the first sign may be used to describe personal information such as a first face feature of the target person or the gender of the target person.

The first sign and the first image may be separately displayed in different areas of the photographing preview interface. For example, the first image may be located in a first area, the first sign may be located in a second area, the first area may be located on one side of the second area, and the display area of the first area may be greater than the display area of the second area.

In addition, the first sign may also be highlighted, and highlighted display includes at least one of display in a preset color, display in a preset shape, and display in a preset size.

Step 102: Receive a first input that is performed on the first sign by a user.

A specific type of the first input is not proudly limited herein. For example, the first input may be a touching input, a pressing input, or a voice input.

Further, in a case that another input that is performed on the first sign by a user is received, the electronic device may be controlled to display a recently obtained image. The recently obtained image is the last image photographed by the electronic device before the photographing preview interface is displayed.

It should be noted that the first input and the another input may be different inputs. For example, the first input may be a sliding input in a preset direction, and the another input may be a sliding input in a non-preset direction; or the first input may be a sliding input, and the another input may be a touching input.

Step 103: Display an album preview interface of the target album in response to the first input, where the target album includes at least one second image, and a person in the second image matches the target person.

When the first sign is a thumbnail, content of the thumbnail may match content of a second image included in the target album. When the similarity between display content of the thumbnail and display content of a second image included in the target album is greater than or equal to a preset threshold, it may be considered that the content of the thumbnail matches the content of the second image included in the target album; or when the similarity is less than the preset threshold, it may be considered that the content of the thumbnail does not match the content of the second image included in the target album.

For example, when the display content of the thumbnail includes a person A, the display content of the second image included in the target album also includes the person A, and the similarity between the person A included in the display content of the thumbnail and the person A included in the display content of the second image is greater than or equal to the preset threshold, it may be considered that the content of the thumbnail matches the content of the second image. Certainly, in this case, it may also be considered that the person A included in the display content of the thumbnail is the same as the person A included in the display content of the second image.

In this way, the first sign is directly displayed on the photographing preview interface, and when the first input for the first sign is received, the album preview interface of the target album may be displayed, that is, jumps to a specific album interface corresponding to the first sign, and does not need to jump between the photographing preview interface and display interfaces of different programs such as different classified albums. Therefore, operation steps of the user are simplified, and jumping efficiency of the album preview interface of the target album is improved. It may be understood that matching between the person in the second image and the target person is: A degree of matching between a second face feature of the person in the second image and a first face feature of the target person is greater than or equal to a preset value, and it may be determined that the person in the second image matches the target person, and when the degree of matching between the second face feature and the first face feature is less than the preset value, it may be determined that the person in the second image does not match the target person.

When the second face feature matches the first face feature, it may be determined that the person in the second image and the target person are a same person.

In the method in this embodiment of this application, the first sign may be displayed on the photographing preview interface, and the first sign may be used as an entry of an exclusive album corresponding to the target person in the first image. In this way, when the first input performed on the first sign is received, an album preview interface of a target album associated with the target person in the first image may be jumped to, thereby simplifying steps of entering the target album.

In addition, each target person corresponds to a target album, that is, different target persons correspond to different target albums, that is, images corresponding to each target person are classified into albums, thereby improving diversity and flexibility of an album classification manner.

In addition, when the user performs an input on the first sign, if the target person in the first image correspondingly has a dedicated target album in the electronic device, the album preview interface of the target album is directly displayed; and if the target person in the first image corresponds to no dedicated target album in the electronic device, a dedicated target album corresponding to the target person may be created, and an album preview interface of the created target album is displayed. In this way, a manner of creating the dedicated target album for the target person is provided for the user.

For example, as shown in FIG. 2, FIG. 2 includes a first image 21 and a first sign 22. The target album may include at least one second image, and a person included in each second image may match a target person in the first image 21, and this may also be understood as that each second image includes a person, and the person matches the target person. Further, that the person in the second image matches the target person may also be understood as that a degree of matching between a second face feature of the person in the second image and a first face feature of the target person is higher than a preset threshold, that is, it may be determined that the person in the second image and the target person are a same person.

In addition, a corresponding target album is created for each person in the second image. For example, if a person A corresponds to an album A, a second image included in the album A includes the person A; and if a person B corresponds to an album B, a second image included in the album B includes the person B.

It should be noted that the target album is created when the electronic device saves the second image for the first time. For example, in a case that a photographing instruction such as a touching input for a photographing control 23 in FIG. 2 is received, when it is determined that a person in the obtained first target image does not have a corresponding first target album, the first target album corresponding to the person is created, and the first target image is stored in the corresponding first target album; and when it is determined that a person in the obtained second target image has a corresponding second target album, the second target image is saved into the second target album.

In an optional implementation, after the displaying an album preview interface of the target album in response to the first input, the method further includes:

obtaining a display parameter of the second image included in the target album; and controlling the first image to be displayed with the display parameter; where the display parameter may include at least one of parameters such as resolution, contrast, a face beautification parameter, a body beautification parameter, a filter parameter, and an AR widget parameter.

In this way, the first image is controlled to be displayed by using the display parameter of the second image, so that a display parameter of the first image does not need to be manually adjusted, an adjustment rate of a display parameter of the first image is enhanced, and operations of the user are simplified.

This implementation of this application may be applied to a case that a common display parameter of the second image in the target album has been determined, or may be understood as a case that a parameter obtained after display of an image is optimized has been determined, so that the corresponding first image may be directly controlled to be displayed by using the common display parameter, that is, the display parameter of the first image does not need to be manually adjusted by a user, thereby enhancing a display effect of the first image.

In an optional implementation, there are one target person, and after the displaying a first sign on a photographing preview interface, the method further includes:

receiving a second input that is performed on the first sign by a user;

displaying T function controls in response to the second input;

receiving a third input that is performed on a target function control in the T function controls by a user; and performing, in response to the third input, first target processing associated with the target function control on the first image; where T is a positive integer.

It should be noted that the T function controls may be displayed on a semi-transparent disk. In this way, the T function controls may be displayed in a centralized manner, thereby enhancing a display effect.

Specific types of the second input and the third input are not specifically limited herein. For example, both the second input and the third input may be touching inputs, sliding inputs, or voice inputs.

Figure 3:
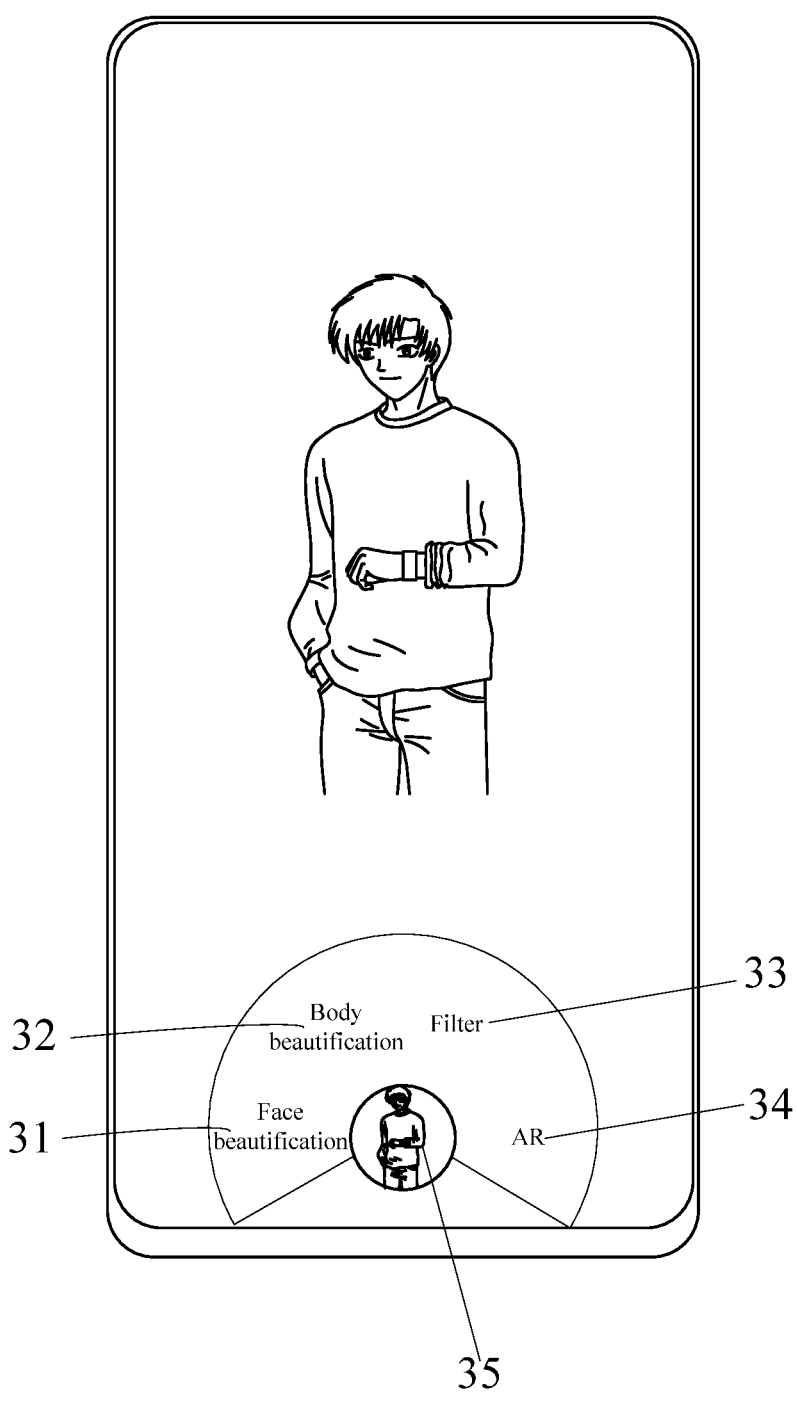
FIG. 3 is a second schematic diagram of a display interface in a display control method according to an embodiment of this application.

A type of the function control is not specifically limited herein. For example, as shown in FIG. 3, the T function controls may include at least one of a face beautification control 31, a body beautification control 32, a filter control 33, and an augmented reality (Augmented Reality, AR) widget control 34. First target processing corresponding to the face beautification control 31 is mainly to beautify the first face feature of the target person in the first image. First target processing corresponding to the body beautification control 32 is mainly to beautify the whole of the target person in the first image, for example, beautifying the body type and the height of the target person. First target processing corresponding to the filter control 33 is mainly to implement a filter effect for the target person in the first image, to enhance a display effect of the first image. First target processing corresponding to the AR widget control 34 is mainly used to add an AR widget (for example, AR glasses or headwear) to display content in the first image.

Figure 4:
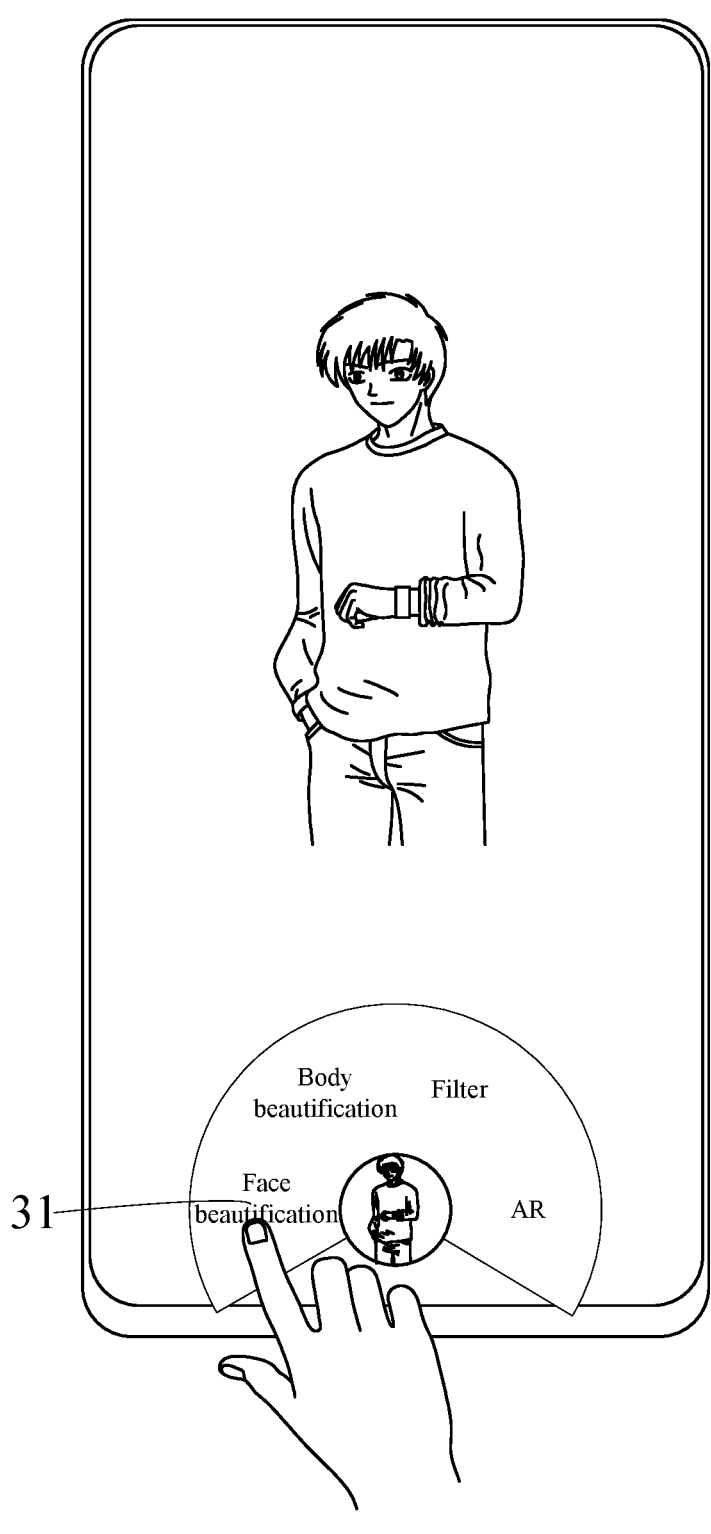
FIG. 4 is a third schematic diagram of a display interface in a display control method according to an embodiment of this application.

In addition, the target function control in the T function controls may be selected by using the third input. For example, as shown in FIG. 4, the third input may be a touching input, and the face beautification control 31 is touched by using the touching input, so that the first target processing with the face beautification control 31 may be performed on the first image. In this case, the first target processing may be understood as face beautification processing.

In addition, as shown in FIG. 4, the third input may alternatively a pressing input that exceeds preset duration. In this case, a progress bar control is generated by pressing the face beautification control 31, and a face beautification degree is adjusted by adjusting a location of a node on a progress bar control. Certainly, for another function control, reference may be made to the foregoing descriptions of the face beautification control 31. Details are not described again.

In this way, a corresponding target operation may be performed on the first image by using the function control, to further improve the display effect of the first image.

The display control method provided in this implementation of this application may be used to display a second input trigger function control of the first sign, and then the target function control is selected according to the third input, and target processing associated with the target function control is performed on the first image. As shown in FIG. 3 and FIG. 4, an application scenario of this implementation of this application may be: optimizing the first image. In this way, the first image may be optimized by using the function control, so that the display effect of the first image is better.

It should be noted that this implementation of this application may be applied to a scene in which the first image includes only one target person.

In an optional implementation, the photographing preview interface further includes a photographing control; and the displaying T function controls in response to the second input includes:

controlling, in response to the second input, the first sign to move toward the photographing control; and displaying the T function controls in a case that the first sign at least partially overlaps the photographing control.

As shown in FIG. 2, FIG. 2 includes the photographing control 23, and the second input may be a sliding input, a voice input, or the like. For example, as shown in FIG. 2, the second input may be a sliding input that slides in a direction A in FIG. 2.

In addition, as shown in FIG. 2, the photographing preview interface may further include the photographing control 23. When the first sign 22 at least partially overlaps the photographing control 23, an interface shown in FIG. 3 may be displayed. As shown in FIG. 3, FIG. 3 includes multiple functional controls, and the multiple functional controls may include a face beautification control 31, a body beautification control 32, a filter control 33, and an AR widget control 34, and a photographing control 35. Display content of the photographing control 35 may include a person, and the person may match the target person in the first image.

In this way, in a case that the first sign at least partially overlaps the photographing control, the T function controls are displayed, so that occurrence of a phenomenon that the T function controls are accidentally triggered to be displayed can be reduced. In addition, because display content of the photographing control 35 may include a person, and the person may match the target person in the first image, so that an effect of prompting the user of a currently focused target person in the first image can be implemented.

This implementation of this application may be applied to a scenario of how to trigger to display the T function controls, and the first sign only needs to be dragged onto the photographing control, so that in a case that the first sign at least partially overlaps the photographing control, the photographing control may be updated to be displayed as the T function controls and a thumbnail that includes a focused target person in the first image, and the T function controls may be set around the thumbnail of the focused target person in the first image. In other words, the thumbnail of the focused target person in the first image and the T function controls may form a semi-transparent disk.

In an optional implementation, the third input is used to trigger photographing; and the performing, in response to the third input, first target processing associated with the target function control on the first image includes:

photographing the target person in response to the third input, and outputting a first target image; and storing the first target image into the target album.

The target function control may be the photographing control 35, that is, the target function control in this implementation may be the photographing control 35 in FIG. 3. It should be noted that, on the basis of FIG. 2, in a case that the second input is received, the photographing control 35 may be obtained by updating display of the photographing control 23 in FIG. 2.

In this way, when the third input for the target function control is received, the first target image may be obtained by photographing the target person in the first image, and the first target image is stored into a dedicated target album corresponding to the target person, so that acquisition of the first target image of the target person is more convenient.

As shown in FIG. 3, other function controls may be distributed around the photographing control 35, that is, the photographing control 35 may be located at a center location, the other function controls may be distributed around the photographing control 35, and the other function controls and the photographing control 35 may form a circular or semi-circular shape. In this way, a display area of the other function controls and the photographing control 35 may be reduced, to increase the display area of the first image, thereby enhancing the display effect of the first image.

In addition, display content of the photographing control 35 may further include a person, and the person may match the target person in the first image, that is, the person included in the display content of the photographing control 35 may be understood as an image of a person in focus on the current photographing preview interface.

This implementation of this application may be applied to a scenario that the target person is photographed, and when another function control is displayed, the target function control that is used to trigger photographing may be further displayed, to facilitate acquiring the first target image corresponding to the target person.

In an optional implementation, the target function control is associated with S function sub-controls, and S is a positive integer; and the performing, in response to the third input, first target processing associated with the target function control on the first image includes:

updating the T function controls to the S function sub-controls; and after the performing, in response to the third input, first target processing associated with the target function control on the first image, the method further includes:

receiving a fourth input that is performed on a target function sub-control in the S function sub-controls by a user; and performing, in response to the fourth input, second target processing associated with the target function sub-control on the first image.

Figure 5:
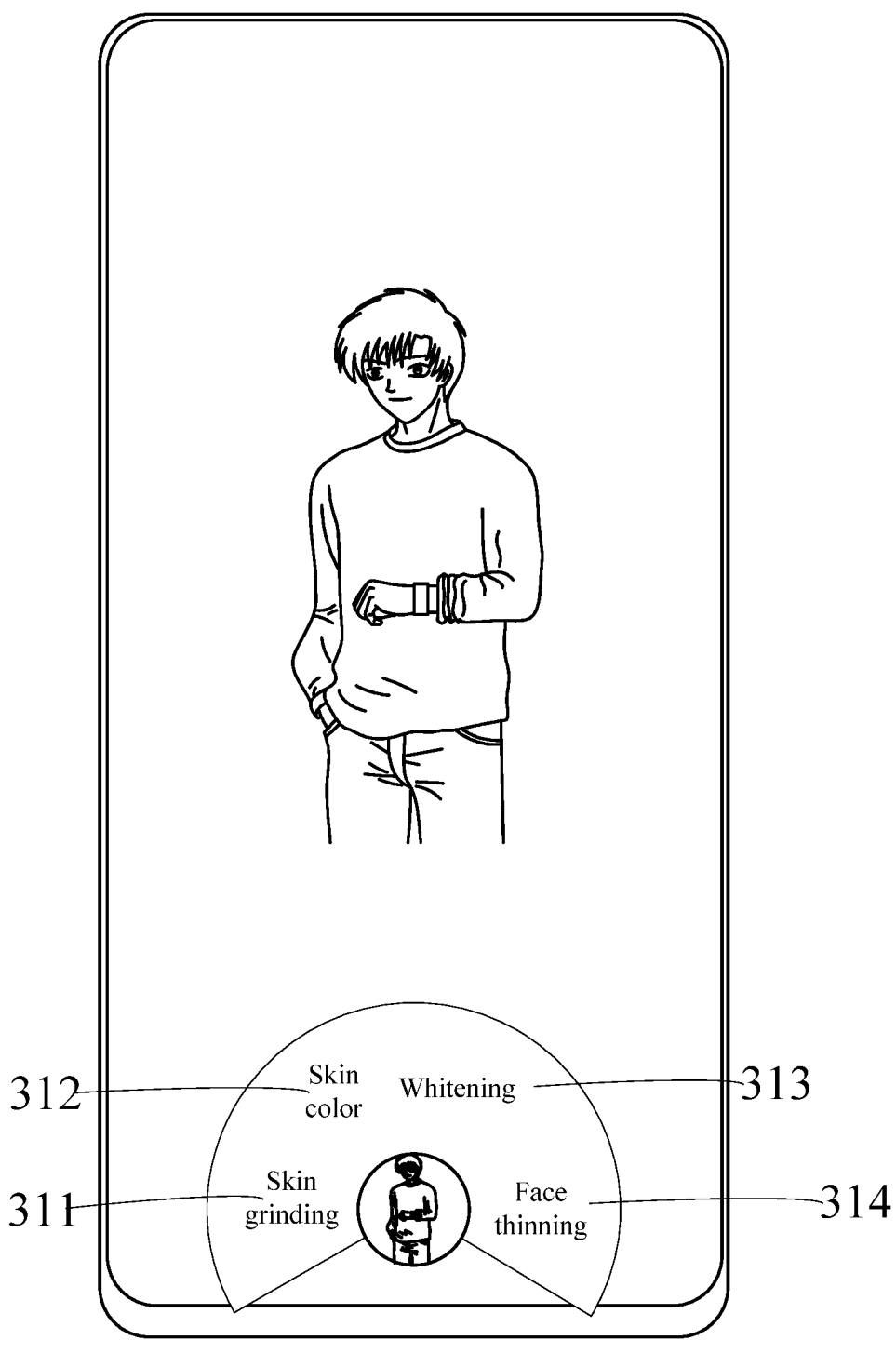
FIG. 5 is a fourth schematic diagram of a display interface in a display control method according to an embodiment of this application.

Each function control may be further associated with another function sub-control. For example, as shown in FIG. 4 and FIG. 5, the target function control may be a face beautification control 31, and the S function sub-controls may include at least one of sub-controls such as a skin grinding sub-control 311, a skin color sub-control 312, a whitening sub-control 313, and a face thinning sub-control 314. When a third input for the face beautification control 31 is received, multiple function controls including the face beautification control 31 may be updated and displayed as sub-controls such as the skin grinding sub-control 311, the skin color sub-control 312, the whitening sub-control 313, and the face thinning sub-control 314.

In addition, second target processing corresponding to the skin grinding sub-control 311 may be understood as performing skin grinding processing on the first image, second target processing corresponding to the skin color sub-control 312 may be understood as adjusting the skin color of the target person in the first image, second target processing corresponding to the whitening sub-control 313 may be understood as performing whitening processing on the target person in the first image, and second target processing corresponding to the face thinning sub-control 314 may be understood as performing face thinning processing on the target person in the first image, that is, adjusting the size of the face.

It should be noted that, after the fourth input for the target function sub-control is received, a display control interface may be updated, and a value that needs to be adjusted may be entered on the control interface. For example, the target function sub-control may be the skin grinding sub-control 311. An input box of a skin grinding degree may be displayed on the control interface, and the user may input a value corresponding to the skin grinding degree. Certainly, the control interface may also include a progress bar, to control a location of a node on the progress bar to control a skin grinding degree of the target person of the first image. For a control method of another function sub-control, reference may be made to the foregoing descriptions of the skin grinding sub-control 311. Details are not described herein again.

In addition, the target function sub-control may alternatively be a progress bar. In this way, a location of a target node on the progress bar is adjusted by using the fourth input, and the target node may be understood as a progress node currently corresponding to the progress bar, so that a target operation for the target function sub-control may be performed on the first image more accurately and conveniently.

For example, when the target function control is a body beautification control, the target function sub-control is a body beautification progress bar, and the location of a target node on the body beautification progress bar may be adjusted by using the fourth input, to adjust a body beautification degree of the first image.

It should be noted that, because the S function sub-controls may be displayed, the S function sub-controls may include at least one of a linear progress bar, a ring sub-control, and a wave sub-control. In this way, diversity and flexibility of a manner of the function sub-control can be enhanced.

In this way, the target function control may be further associate with other function sub-controls, so that the function sub-controls may be classified and managed. Only when the target function control is triggered, the function sub-controls associated with the target function control are displayed, thereby avoiding a phenomenon that the function sub-control is accidentally touched. In addition, compared with a manner of directly displaying all the function sub-controls, a display area occupied by the function sub-control is reduced, and power consumption is reduced.

This implementation of this application may be applied to a scene in which the function sub-control may be folded or hidden to be displayed. Only when a target function control corresponding to a specific type of function sub-control is triggered, a folded or hidden function sub-control is displayed, so that a display area is reduced, and a probability that the function sub-control is accidentally triggered is also reduced.

In an optional implementation, both the quantity of the target person and the quantity of the first sign are N, and N is an integer greater than 1; and before the displaying a first sign on a photographing preview interface, the method further includes:

receiving a fifth input that is performed on N target persons on the photographing preview interface by a user; and the displaying a first sign on a photographing preview interface includes:

displaying N first signs on the photographing preview interface in response to the fifth input, where each first sign indicates a target album associated with one target person in the first image.

FIG. 6 shows a photographing scenario with at least two target persons, that is, the first image displayed on the photographing preview interface includes at least two target persons. For example, FIG. 6 includes five target persons and five first signs, and the five target persons are respectively a first target person 601, a second target person 602, a third target person 603, a fourth target person 604, and a fifth target person 605, and the five first signs include a first sign 611, a first sign 612, a first sign 613, a first sign 614, and a first sign 615. The first target person 601 corresponds to the first sign 611, the second target person 602 corresponds to the first sign 612, the third target person 603 corresponds to the first sign 613, the fourth target person 604 corresponds to the first sign 614, and the fifth target person 605 corresponds to the first sign 615. The five first identities may be displayed in a manner of thumbnail images corresponding to the target persons.

A correspondence between the target person and the thumbnail image may be understood as follows: For example, the first target person 601 corresponds to the first sign 611, and after an input for the first sign 611 is received, a preview interface of an album corresponding to the first sign 611 may be displayed. All persons in images included in the album match the first target person 601, that is, the album may be understood as an exclusive album of the first target person 601.

In this way, in a case that the first image includes at least two target persons, a first sign corresponding to each target person may be displayed, and an album preview interface of a dedicated target album of a corresponding target person may be triggered by using the first sign. In other words, the first sign provides each target person with an entry for entering a corresponding dedicated target album, so that it is more convenient to display an album preview interface of a dedicated target album corresponding to a specific target person.

In other words, this implementation of this application may be applied to a first image that includes multiple target persons, so that a first sign corresponding to each target person may be displayed. In a scene in which each target person is provided with one entry into a corresponding dedicated target album, it is more convenient to display an album preview interface of a dedicated target album corresponding to a specific target person.

It should be noted that first signs corresponding to all target persons included in the first image may be displayed, or certainly, only first signs corresponding to of the target persons in the first image may be displayed.

In an optional implementation, and after the displaying a first sign on a photographing preview interface, the method further includes:

receiving a sixth input performed that is performed on P target persons in the N target persons by a user and a seventh input that is performed by a user, where the seventh input is used to trigger photographing;

separately photographing each target person in the P target persons in response to the sixth input and the seventh input, and outputting P second target images; and separately storing the P second target images into an album associated with a target person corresponding to each second target image; where P is a positive integer, and P<N.

The sixth input is used to select the P target persons from the N target persons. For example, as shown in FIG. 6 to FIG. 14, in FIG. 6, a first target person 601, a second target person 602, a third target person 603, and a fourth target person 604 are determined by using a graphical sign, and a fifth target person 605 is not determined by using the graphical sign, that is, the target person selected by the sixth input may be circled by the graphical sign shown in FIG. 6 to FIG. 14, and the graphical sign may be a dotted-line box, and a target person not selected by the sixth input is not circled by the graphical sign.

Certainly, after the first sign corresponding to the selected target person is displayed, the selected target person may be added or reduced according to an input that is performed by a user. Correspondingly, after the selected target person is added, the first sign corresponding to the selected target person is also displayed on the photographing preview interface. After the selected target person is reduced, the first sign corresponding to the target person is not displayed on the photographing preview interface.

Figure 7:
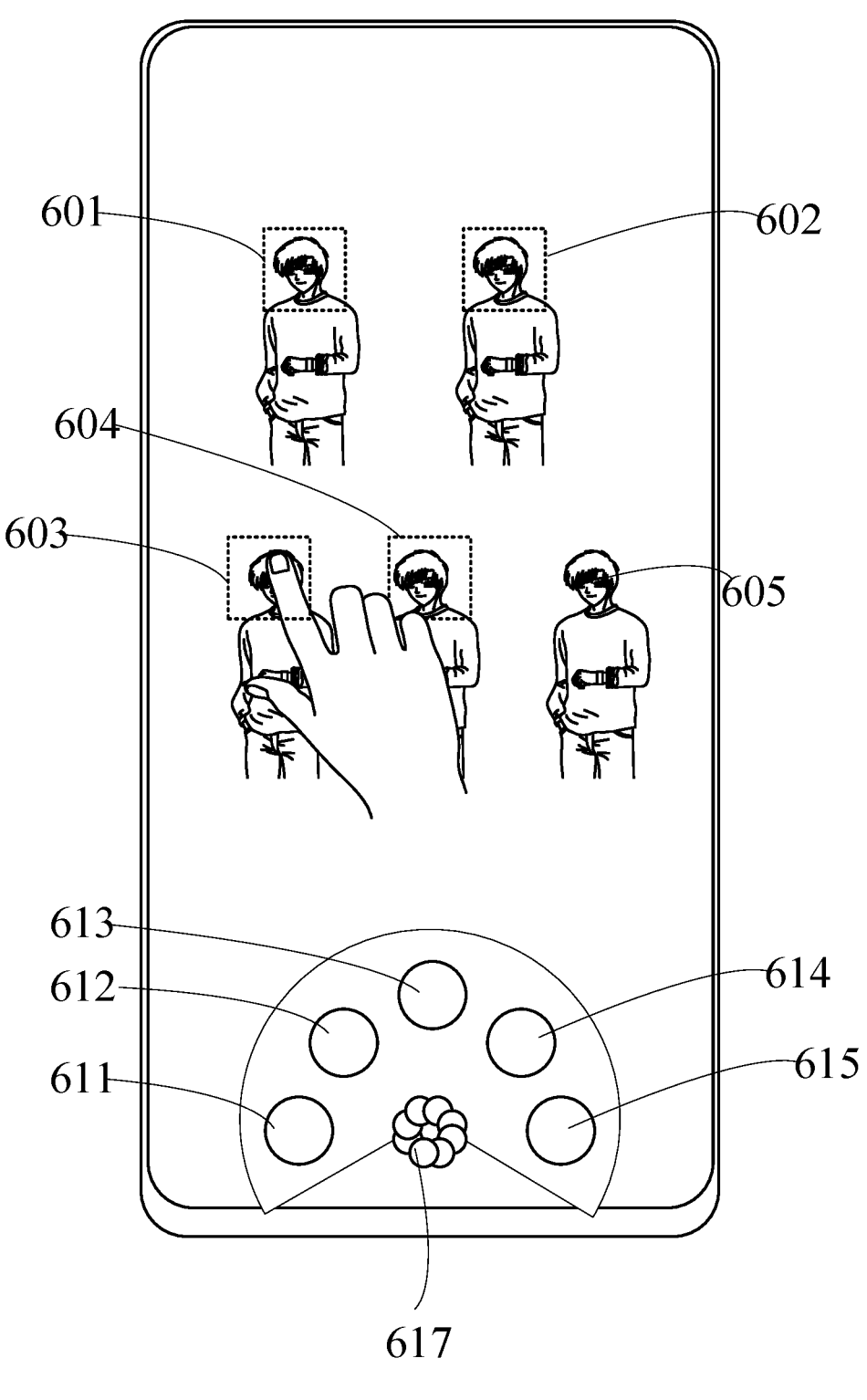
FIG. 7 is a sixth schematic diagram of a display interface in a display control method according to an embodiment of this application.
Figure 8:
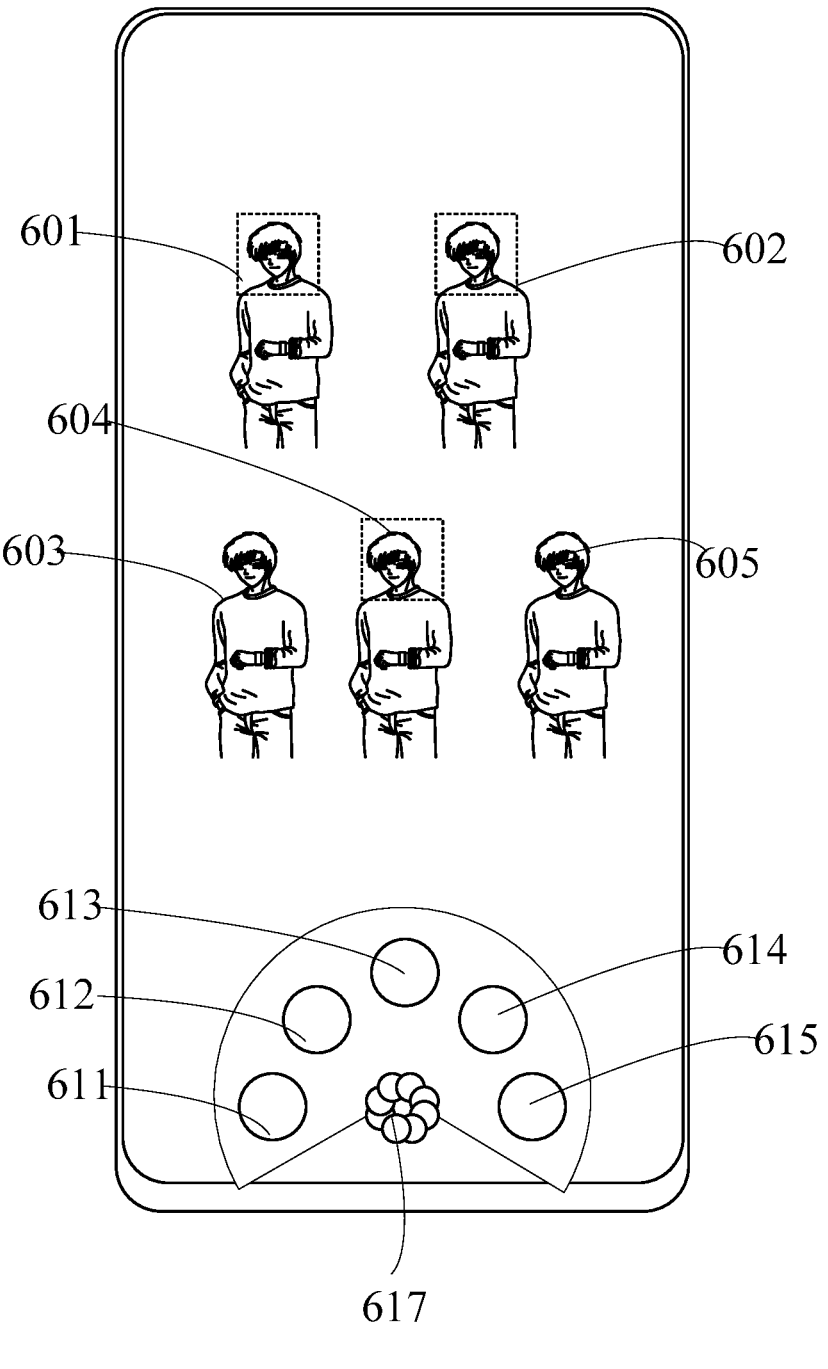
FIG. 8 is a seventh schematic diagram of a display interface in a display control method according to an embodiment of this application.

For example, as shown in FIG. 6 to FIG. 8, a target person determined by using a graphical sign may be determined by using the sixth input that is performed by a user. The sixth input may be a touching input in FIG. 7. For example, by using the input that is performed by a user in FIG. 7, a third target person 603 determined in FIG. 6 may be adjusted to a third target person 603 not determined in FIG. 8.

Figure 9:
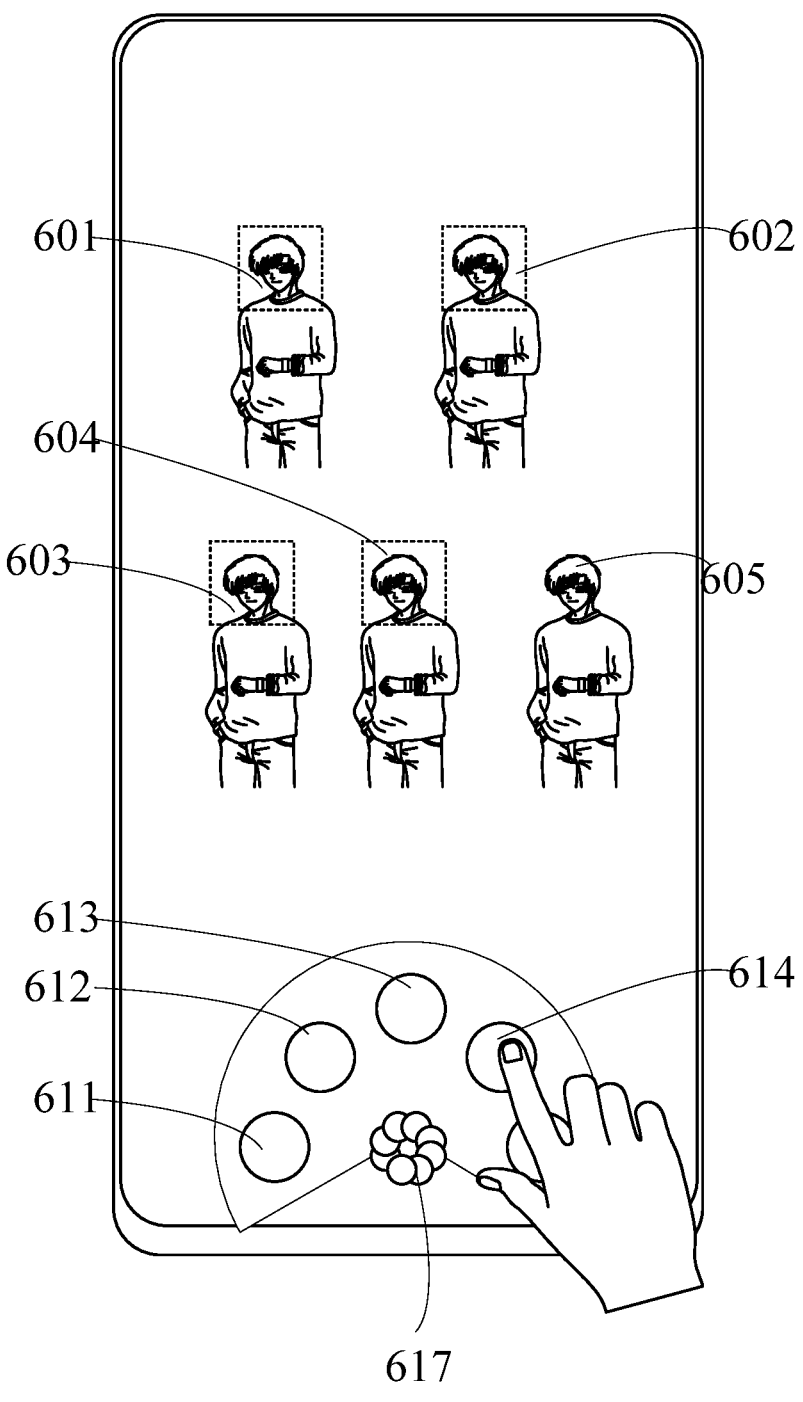
FIG. 9 is an eighth schematic diagram of a display interface in a display control method according to an embodiment of this application.

It should be noted that, as shown in FIG. 9, when the user receives an input for the first sign 614, an album preview interface of a target album corresponding to the first sign 614 may be displayed, and at least one second image may be displayed on the album preview interface. A person included in the second image matches a fourth target person 604, that is, the album may be understood as an exclusive album of the fourth target person 604.

As shown in FIG. 6 to FIG. 14, the photographing preview interface further includes a photographing control 617, and the seventh input may be an input for the photographing control 617. Certainly, the seventh input may be one of a touching input, a pressing input, and a voice input.

Figure 10:
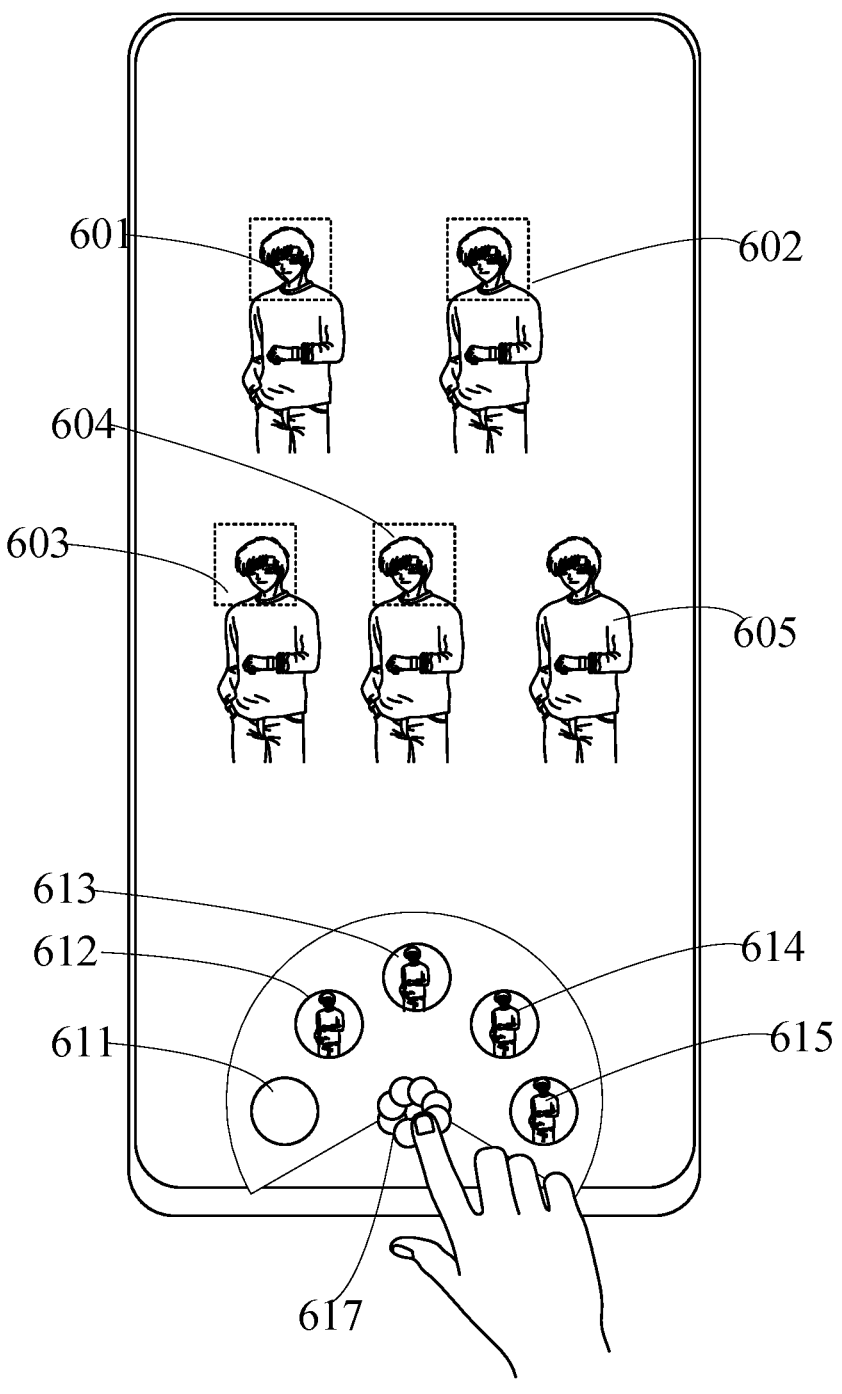
FIG. 10 is a ninth schematic diagram of a display interface in a display control method according to an embodiment of this application.

For example, as shown in FIG. 10, in a case that the input for the photographing control 617 is received, determined target persons may be photographed. The target persons are a first target person 601, a second target person 602, a third target person 603, and a fourth target person 604 that are selected by using a graphical sign in FIG. 10, and each image is stored into a corresponding dedicated target album.

In this implementation, a new second target image is updated and stored in only the target album corresponding to the selected target person, and the new second target image is not updated or stored in a target album corresponding to an unselected target person. In this way, flexibility and diversity of a manner of updating the second target image are enhanced, and intelligence of the electronic device is further improved. In addition, in this implementation, at least two target persons included in the first image may be photographed at the same time, and a photographed photo is stored into a corresponding album.

This implementation of this application may be applied to a scene in which the first image includes multiple target persons, some of target persons may be selected from the first image, a personal photo of each target person is photographed, and the personal photo is stored into a corresponding dedicated target album. It may be understood that the graphic sign may be used only to box select the target person.

In another optional implementation, in response to the fifth input, the N target persons are focused, one focusing box is displayed in an area in which each target person is located, N first signs are displayed on the photographing preview interface, and each first sign indicates a target album associated with one target person in the first image.

In this way, the target person may be selected by using the focusing box, and a first sign corresponding to the target person selected by using the focusing box is displayed, and the target person does not need to be selected by using the sixth input, thereby simplifying a manner of selecting the target person. It should be noted that the focusing box herein may simultaneously play an effect of focusing the target person and selecting the target person by using a frame.

It should be noted that in a case that the graphical sign is a focusing box, the focusing box may simultaneously play an effect of focusing the target person and box selecting the target person.

In another optional implementation, after the displaying N first signs on the photographing preview interface in response to the fifth input, the method further includes:

receiving an eighth input that is performed on an $i^{th}$ first sign and a $j^{th}$ first sign in the N first signs by a user;

in response to the eighth input, updating the $i^{th}$ first sign and the $j^{th}$ first sign to a $k^{th}$ first sign, and establishing an association relationship between the $k^{th}$ first sign and a group photo album of the $i^{th}$ target person and the $j^{th}$ target person, where the $k^{th}$ first sign is a sign obtained after the $i^{th}$ first sign and the $j^{th}$ first sign are combined, and the $k^{th}$ first sign indicates a group photo album associated with the $i^{th}$ target person and the $j^{th}$ target person;

receiving a ninth input that is performed by a user;

photographing an $i^{th}$ target person and a $j^{th}$ target person according to an indication of the $k^{th}$ first sign in response to the ninth input, and outputting a third target image; and storing the third target image into a group photo album indicated by the $k^{th}$ first sign; where i and j are positive integers, the $i^{th}$ first sign and the $j^{th}$ first sign are any two of the N first signs, i≤N, and j≤N.

Figure 11:
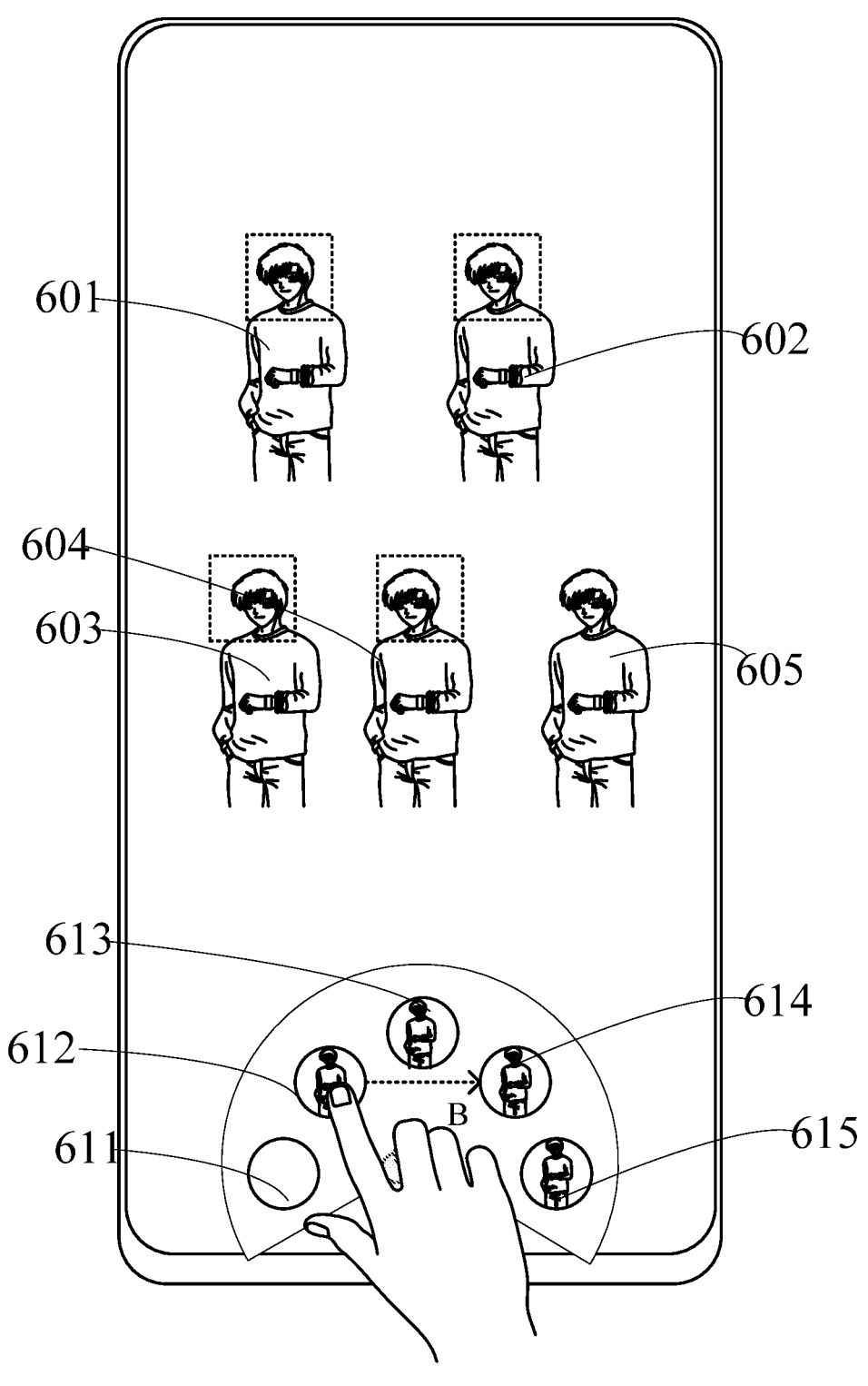
FIG. 11 is a tenth schematic diagram of a display interface in a display control method according to an embodiment of this application.
Figure 12:
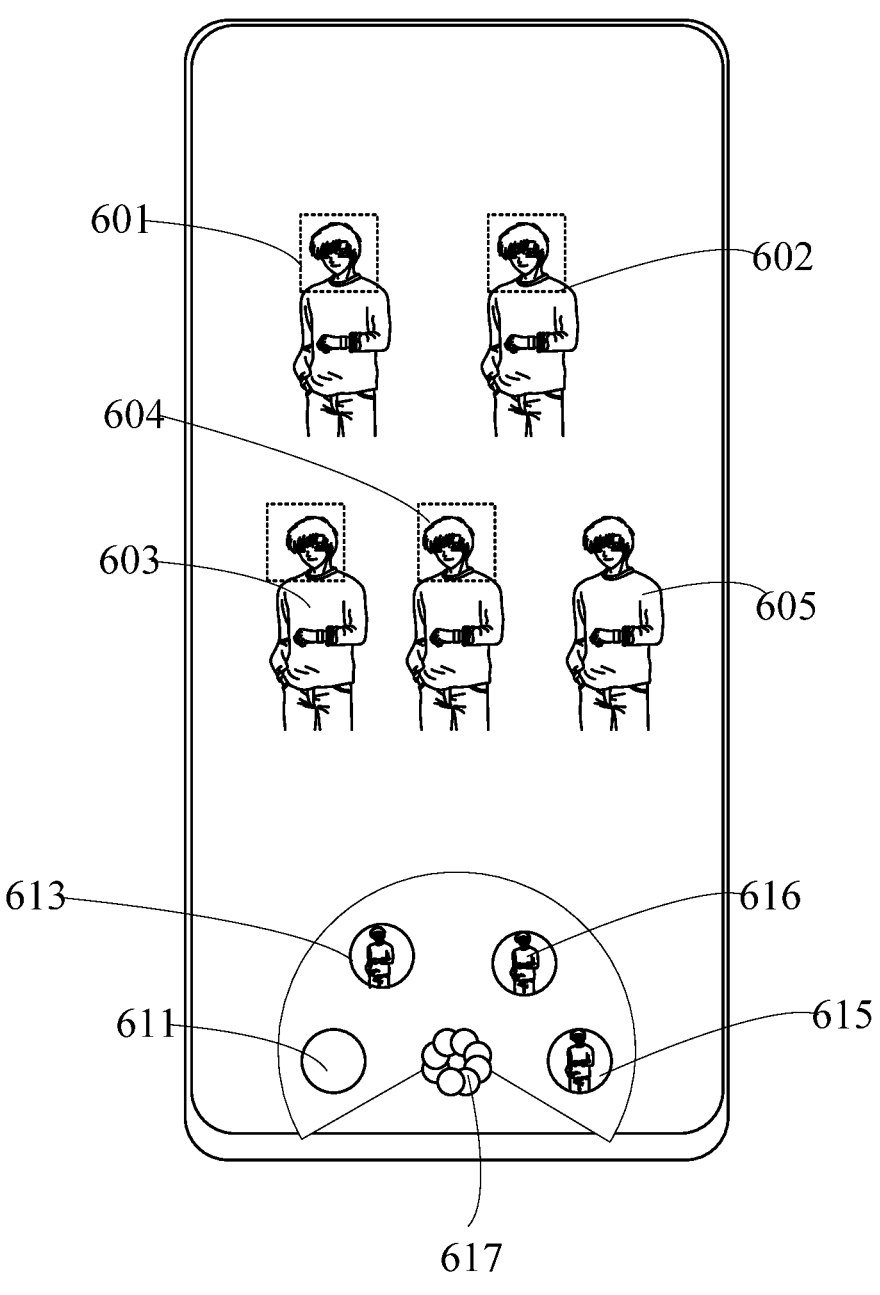
FIG. 12 is an eleventh schematic diagram of a display interface in a display control method according to an embodiment of this application.

The $i^{th}$ first sign may be a first sign 612 in FIG. 11, the $i^{th}$ first sign may be a first sign 614, and the $k^{th}$ first sign may be a first sign 616 in FIG. 12.

The $i^{th}$ first sign, the $i^{th}$ target person, and the target album corresponding to the $i^{th}$ target person are in a one-to-one correspondence, the $j^{th}$ first sign, the $j^{th}$ first target person, and the target album corresponding to the $j^{th}$ target person are in a one-to-one correspondence, the $k^{th}$ first sign corresponds to the group photo album associated with the $i^{th}$ target person and the $j^{th}$ target person, each image in the group photo album includes a face feature of the $i^{th}$ target person and a face feature of the $j^{th}$ target person, and display content of the $k^{th}$ first sign may include the face feature of the $i^{th}$ target person and the face feature of the $j^{th}$ target person.

Figure 13:
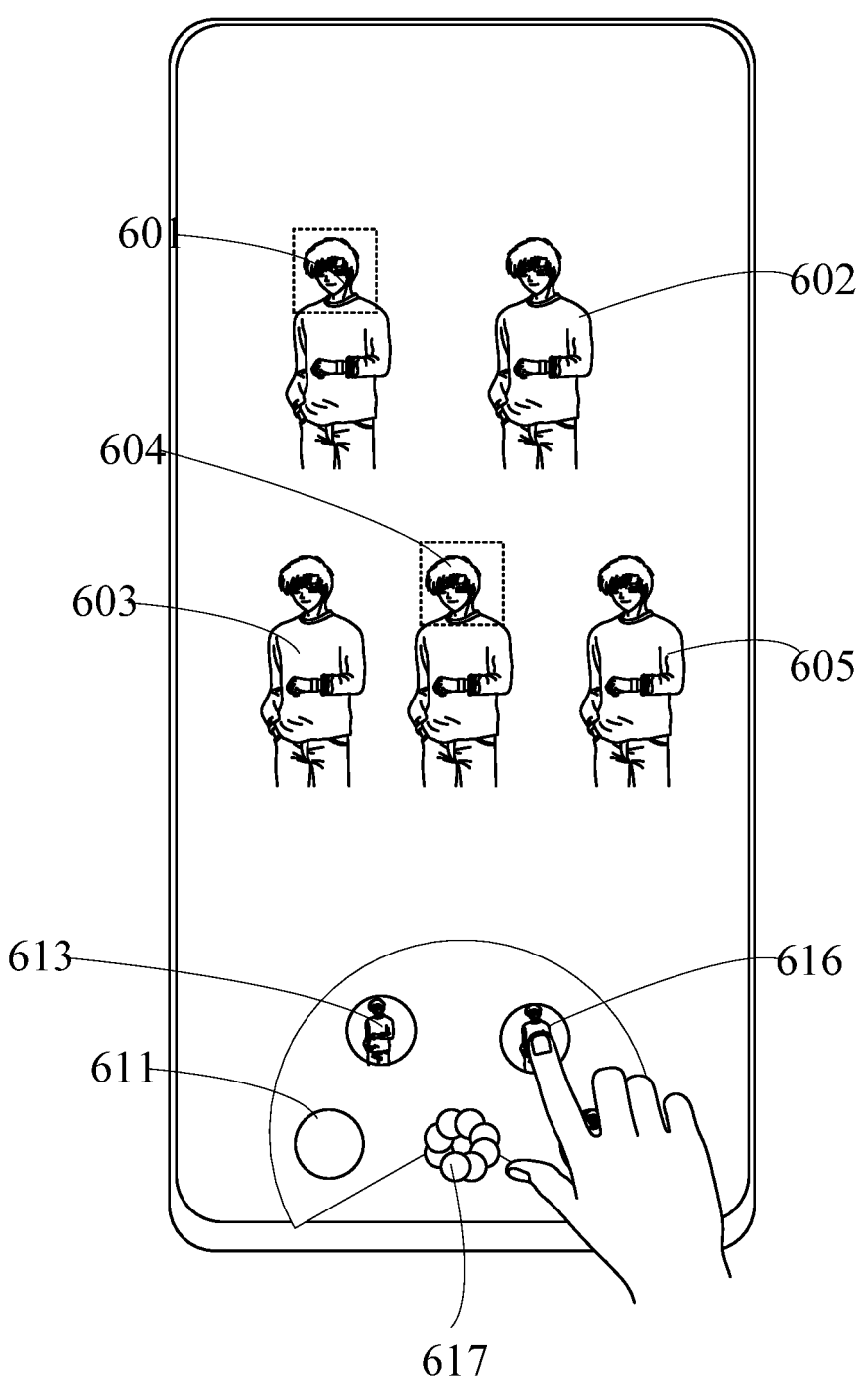
FIG. 13 is a twelfth schematic diagram of a display interface in a display control method according to an embodiment of this application.
Figure 14:
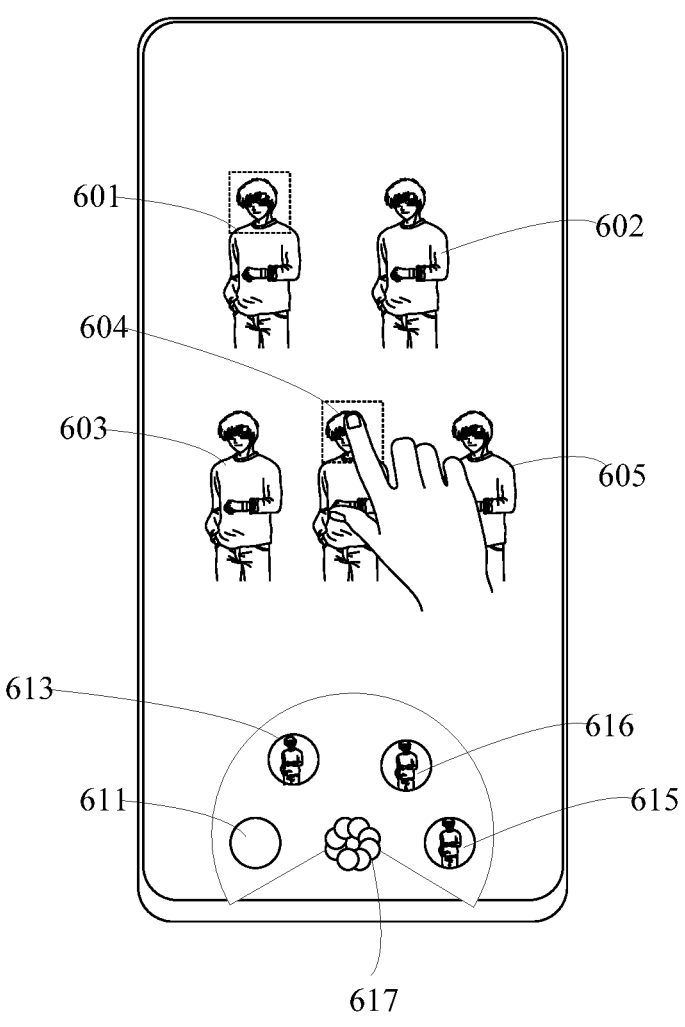
FIG. 14 is a thirteenth schematic diagram of a display interface in a display control method according to an embodiment of this application.

As shown in FIG. 11, the first sign 612 and the first sign 614 may be combined and displayed as the first sign 616 in FIG. 12 by using the eighth input that is performed by a user, and the eighth input may be a sliding input in a direction B in FIG. 11. As shown in FIG. 13, when an input for the first sign 616 is received, a preview image of an album of the first sign 616, that is, a group photo album of target persons corresponding to the first sign 612 and the first sign 614, may be displayed. In addition, in a case that a touch and hold input for the first sign 616 shown in FIG. 13 is received, as shown in FIG. 14, two target persons corresponding to the first sign 616, that is, a first target person 601 and a fourth target person 604, may be displayed. If an input for one of the first target person 601 and the fourth target person 604 is received, the selected target person may also be added to a group photo album of the first target person 601 and the fourth target person 604. The selected target person is a fourth target person 604 shown in FIG. 14, that is, after the fourth target person 604 is selected, even if an input for a photographing control 617 is received, an image that includes the fourth target person 604 is not added in the group photo album.

The ninth input may be an input for the photographing control 617 shown in FIG. 12 to FIG. 14, for example, the ninth input may be a touching input, a pressing input, or a voice input.

The third target image may be a group photo of target persons corresponding to the first sign 612 and the first sign 614.

This implementation of this application may be applied to combining two first signs, and then, in a case that the ninth input is received, obtaining a group photo album of target persons corresponding to the two first signs through photographing, and storing the group photo into a corresponding group photo album, thereby making photographing of the group photo more convenient.

In addition, during photographing of the group photo of the target persons corresponding to the two first signs, personal photos of the two target persons may be further photographed, that is, the image includes only one target person, and the personal photos are stored into a corresponding dedicated target album. In other words, in addition to photographing the third target image, a personal photo is photographed separately for a target person included in the third target image, and the personal photo is stored into a corresponding exclusive album.

In other words, this implementation of this application may be applied to a scene in which two target persons are quickly selected from multiple target persons and a group photo of the two target persons is photographed.

It should be noted that multiple first signs may alternatively be combined; in other words, this implementation is not limited to combination of two first signs. In this way, a group photo of multiple target persons may be implemented, and a group photo is stored into a corresponding group photo album, thereby making photographing of the group photo more convenient and more flexible.

In addition, when a corresponding group photo album is created in the electronic device, the group photo is directly stored into the created group photo album. When the group photo album is not created in the electronic device, the group photo album may be created first, and then the group photo is stored into the corresponding group photo album.

In this embodiment of this application, the electronic device may be a mobile phone, a tablet personal computer (Tablet Personal Computer), a laptop computer (Laptop Computer), a personal digital assistant (Personal Digital Assistant, PDA for short), a mobile internet device (Mobile Internet Device, MID), a wearable device (Wearable Device), or the like.

It should be noted that, the display control method provided in this embodiment of this application may be performed by a display control apparatus or a control module that is in the display control apparatus and that is configured to perform the display control method. In this embodiment of this application, the display control apparatus provided in this embodiment of this application is described by using an example in which the display control apparatus performs the display control method.

Figure 15:
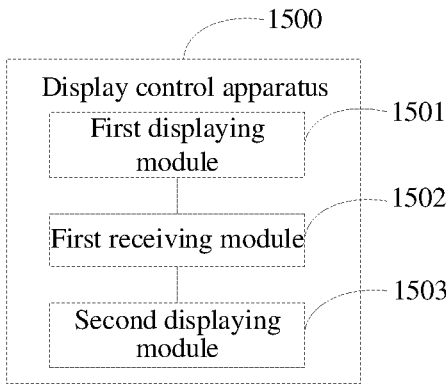
FIG. 15 is a schematic diagram of a structure of a display control apparatus according to an embodiment of this application.

As shown in FIG. 15, an embodiment of this application further provides a display control apparatus. As shown in FIG. 15, a display control apparatus 1500 includes:

a first displaying module 1501, configured to display a first sign on a photographing preview interface, where the first sign indicates a target album associated with a target person in a first image, and the first image is a preview image displayed on the photographing preview interface;

a first receiving module 1502, configured to receive a first input that is performed on the first sign by a user; and a second displaying module 1503, configured to display an album preview interface of the target album in response to the first input; where the target album includes at least one second image, and a person in the second image matches the target person.

Optionally, the display control apparatus 1500 further includes:

a second receiving module, configured to receive a second input that is performed on the first sign by a user;

a third displaying module, configured to display T function controls in response to the second input;

a third receiving module, configured to receive a third input that is performed on a target function control in the T function controls by a user; and a first execution module, configured to perform, in response to the third input, first target processing associated with the target function control on the first image; where T is a positive integer.

Optionally, the photographing preview interface further includes a photographing control, and the third displaying module includes:

a control sub-module, configured to control, in response to the second input, the first sign to move toward the photographing control; and a display sub-control, configured to display the T function controls in a case that the first sign at least partially overlaps the photographing control.

Optionally, the third input is used to trigger photographing, and the first execution module includes:

a photographing sub-module, configured to photograph the target person in response to the third input, and output a first target image; and a storage sub-module, configured to store the first target image into the target album.

Optionally, the target function control is associated with S function sub-controls, and S is a positive integer;

the first execution module is further configured to update the T function controls to the S function sub-controls; and the display control apparatus 1500 further includes:

a fourth receiving module, configured to receive a fourth input that is performed on a target function sub-control in the S function sub-controls by a user; and a second execution module, configured to perform, in response to the fourth input, second target processing associated with the target function sub-control on the first image.

Optionally, both the quantity of the target person and the quantity of the first sign are N, and N is an integer greater than 1;

the display control apparatus 1500 further includes:

a fifth receiving module, configured to receive a fifth input that is performed on N target persons on the photographing preview interface by a user; and the first displaying module is further configured to display N first signs on the photographing preview interface in response to the fifth input, where each first sign indicates a target album associated with one target person in the first image.

Optionally, the display control apparatus 1500 further includes:

a sixth receiving module, configured to receive a sixth input that is performed on P target persons in the N target persons by a user and a seventh input that is performed by a user, where the seventh input is used to trigger photographing;

a first photographing module, configured to separately photograph each target person in the P target persons in response to the sixth input and the seventh input, and output P second target images; and a first storage module, configured to separately store the P second target images into an album associated with a target person corresponding to each second target image; where P is a positive integer, and P≤N.

Optionally, the display control apparatus 1500 further includes:

a seventh receiving module, configured to receive an eighth input that is performed on an $i^{th}$ first sign and a $j^{th}$ first sign in the N first signs by a user;

an updating module, configured to: in response to the eighth input, update the $i^{th}$ first sign and the $j^{th}$ first sign to a $k^{th}$ first sign, and establish an association relationship between the $k^{th}$ first sign and a group photo album of the $i^{th}$ target person and the $j^{th}$ target person, where the $k^{th}$ first sign is a sign obtained after the $i^{th}$ first sign and the $j^{th}$ first sign are combined, and the $k^{th}$ first sign indicates a group photo album associated with the $i^{th}$ target person and the $j^{th}$ target person;

an eighth receiving module, configured to receive a ninth input that is performed by a user;

a second photographing module, configured to photograph an $i^{th}$ target person and a $j^{th}$ target person according to an indication of the $k^{th}$ first sign in response to the ninth input, and output a third target image; and a second storage module, configured to store the third target image into a group photo album indicated by the $k^{th}$ first sign; where i and j are positive integers, the $i^{th}$ first sign and the $j^{th}$ first sign are any two of the N first signs, i≤N, and j≤N.

In this embodiment of this application, the first sign may also be displayed on the photographing preview interface, and when the first input for the first sign is received, the album preview interface of the target album may be displayed, so that operation steps of the user are simplified, and jumping efficiency of the album preview interface of the target album is improved.

The display control apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (ultra-mobile personal computer, UMPC), a netbook, or a personal digital assistant (personal digital assistant, PDA), and the non-mobile electronic device may be a server, a network attached storage (Network Attached Storage, NAS), a personal computer (personal computer, PC), a television (television, TV), a counter, or a self-service machine. This is not specifically limited in this embodiment of this application.

The display control apparatus in this embodiment of this application may be an apparatus with an operating system. The operating system may be an Android (Android) operating system, may be an iOS operating system, or may be another possible operating system. This is not specifically limited in this embodiment of this application.

The display control apparatus provided in this embodiment of this application can implement processes implemented in the method embodiments of FIG. 1 to FIG. 14. To avoid repetition, details are not described herein again.

Figure 16:
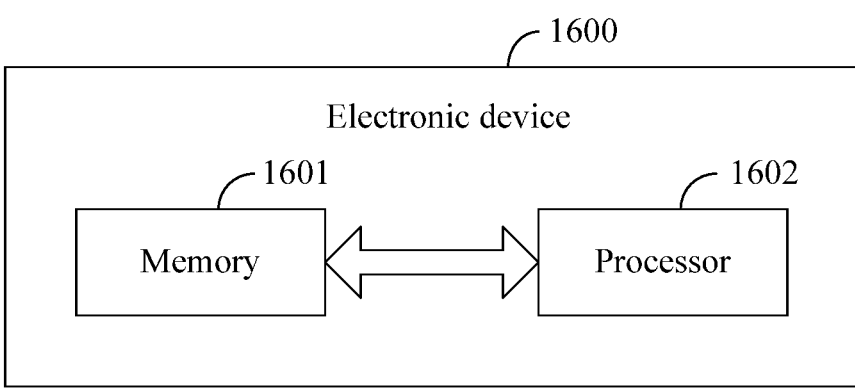
FIG. 16 is a first schematic diagram of a structure of an electronic device according to an embodiment of this application.

Optionally, as shown in FIG. 16, an embodiment of this application further provides an electronic device 1600, including a processor 1601, a memory 1602, and a program or an instruction that is stored in the memory 1602 and that can run on the processor 1601. When the program or the instruction is executed by the processor 1601, processes of the embodiments of the display control method can be implemented, and a same technical effect can be achieved. To avoid repetition, details are not described herein.

It should be noted that the electronic device in this embodiment of this application includes the foregoing mobile electronic device and the foregoing non-mobile electronic device.

Figure 17:
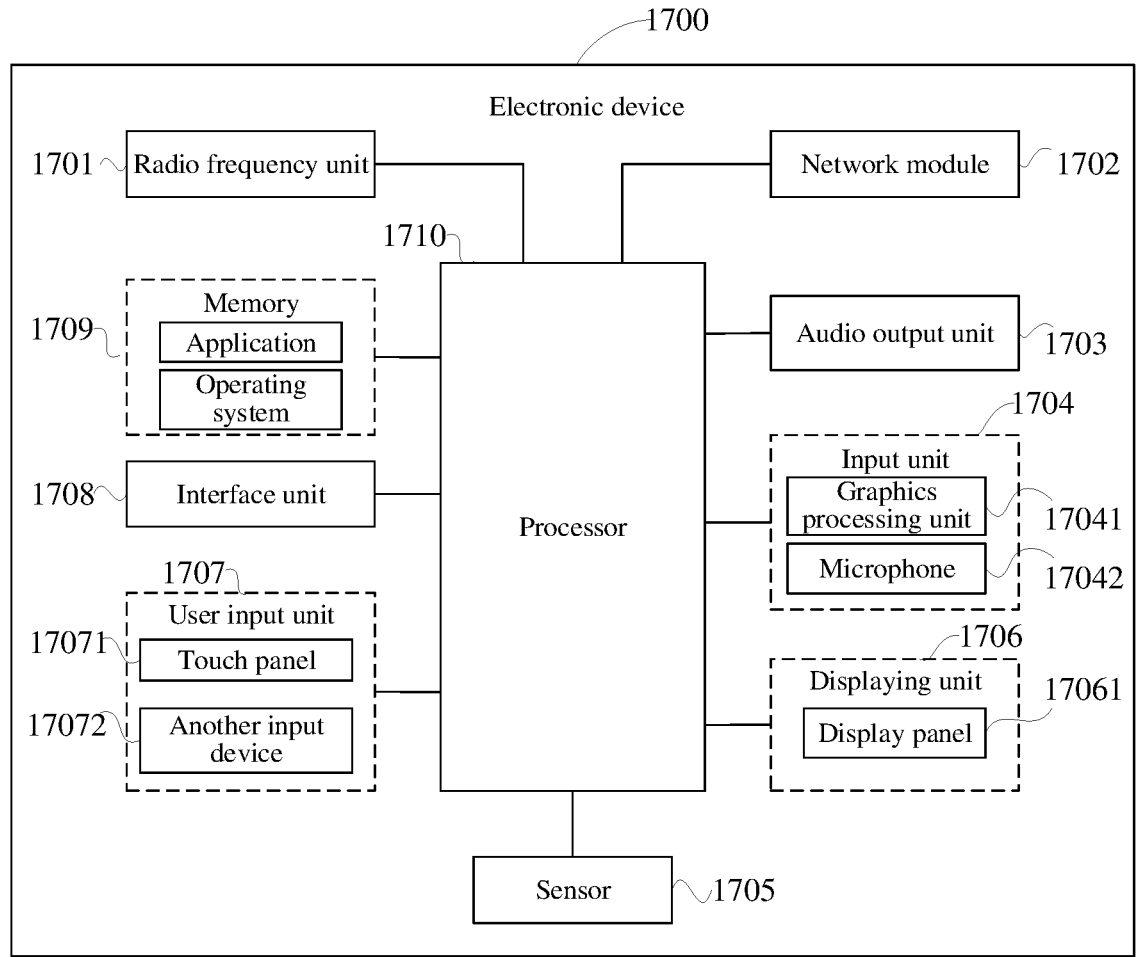
FIG. 17 is a second schematic diagram of a structure of an electronic device according to an embodiment of this application.

FIG. 17 is a schematic diagram of a hardware structure of an electronic device for implementing embodiments of this application.

The electronic device 1700 includes but is not limited to components such as a radio frequency unit 1701, a network module 1702, an audio output unit 1703, an input unit 1704, a sensor 1705, a displaying unit 1706, a user input unit 1707, an interface unit 1708, a memory 1709, a camera, and a processor 1710.

It may be understood by a person skilled in the art that the electronic device 1700 may further include a power supply (such as a battery) that supplies power to each component. The power supply may be logically connected to the processor 1710 by using a power management system, to implement functions such as charging, discharging, and power consumption management by using the power management system. A structure of the electronic device shown in FIG. 17 does not constitute a limitation on the electronic device, and may include more or fewer parts than those shown in the figure, or combine some components, or have different part arrangements. Details are not described herein again.

The displaying unit 1706 is configured to display a first sign on a photographing preview interface, where the first sign indicates a target album associated with a target person in a first image, and the first image is a preview image displayed on the photographing preview interface.

The user input unit 1707 is configured to receive a first input that is performed on the first sign by a user.

The displaying unit 1706 is configured to display an album preview interface of the target album in response to the first input.

The target album includes at least one second image, and a person in the second image matches the target person.

Optionally, the user input unit 1707 is further configured to receive a second input that is performed on the first sign by a user.

The displaying unit 1706 is further configured to display T function controls in response to the second input.

The user input unit 1707 is further configured to receive a third input that is performed on a target function control in the T function controls by a user.

The processor 1710 is configured to perform, in response to the third input, first target processing associated with the target function control on the first image.

T is a positive integer.

Optionally, the photographing preview interface further includes a photographing control.

That the displaying unit 1706 displays T function controls in response to the second input includes:

The processor 1710 is configured to control, in response to the second input, the first sign to move toward the photographing control.

The displaying unit 1706 is configured to display the T function controls in a case that the first sign at least partially overlaps the photographing control.

Optionally, the third input is used to trigger photographing.

That the processor 1710 performs, in response to the third input, first target processing associated with the target function control on the first image includes:

The camera is configured to photograph the target person in response to the third input, and output a first target image.

The processor 1710 is configured to store the first target image into the target album.

Optionally, the target function control is associated with S function sub-controls, and S is a positive integer.

That the processor 1710 performs, in response to the third input, first target processing associated with the target function control on the first image includes:

The processor 1710 is configured to update the T function controls to the S function sub-controls.

After the performing, in response to the third input, first target processing associated with the target function control on the first image, the following is further included:

The user input unit 1707 is further configured to receive a fourth input that is performed on a target function sub-control in the S function sub-controls by a user.

The processor 1710 is configured to perform, in response to the fourth input, second target processing associated with the target function sub-control on the first image.

Optionally, both the quantity of the target person and the quantity of the first sign are N, and N is an integer greater than 1.

The user input unit 1707 is further configured to receive a fifth input that is performed on N target persons on the photographing preview interface by a user.

The displaying unit 1706 is further configured to display N first signs on the photographing preview interface in response to the fifth input, where each first sign indicates a target album associated with one target person in the first image.

Optionally, the user input unit 1707 is further configured to receive a sixth input that is performed on P target persons in the N target persons by a user and a seventh input that is performed by a user, where the seventh input is used to trigger photographing.

The camera is further configured to separately photograph each target person in the P target persons in response to the sixth input and the seventh input, and output P second target images.

The processor 1710 is further configured to separately store the P second target images into an album associated with a target person corresponding to each second target image.

P is a positive integer, and $P \leq N$.

Optionally, the user input unit 1707 is further configured to receive an eighth input that is performed on an $i^{th}$ first sign and a $j^{th}$ first sign in the N first signs by a user.

The processor 1710 is further configured to: in response to the eighth input, update the $i^{th}$ first sign and the $j^{th}$ first sign to a $k^{th}$ first sign, and establish an association relationship between the $k^{th}$ first sign and a group photo album of the $i^{th}$ target person and the $j^{th}$ target person, where the $k^{th}$ first sign is a sign obtained after the $i^{th}$ first sign and the $j^{th}$ first sign are combined, and the $k^{th}$ first sign indicates a group photo album associated with the $i^{th}$ target person and the $j^{th}$ target person.

The user input unit 1707 is further configured to receive a ninth input that is performed by a user.

The camera is further configured to photograph an $i^{th}$ target person and a $j^{th}$ target person according to an indication of the $k^{th}$ first sign in response to the ninth input, and outputting a third target image.

The processor 1710 is further configured to store the third target image into a group photo album indicated by the $k^{th}$ first sign.

i and j are positive integers, the $i^{th}$ first sign and the $j^{th}$ first sign are any two of the N first signs, i≤N, and j≤N.

In this implementation of this application, operation steps of the user can also be simplified, and jumping efficiency of the album preview interface of the target album is improved.

It should be understood that, in this embodiment of this application, the input unit 1704 may include a graphics processing unit (Graphics Processing Unit, GPU) 17041 and a microphone 17042. The graphics processing unit 17041 processes image data of a static picture or a video obtained by an image capture apparatus (such as a camera) in a video capture mode or an image capture mode. The displaying unit 1706 may include a display panel 17061, and the display panel 17061 may be configured in a form of a liquid crystal display, an organic light emitting diode, or the like. The user input unit 1707 includes a touch panel 17071 and another input device 17072. The touch panel 17071 is also referred to as a touchscreen. The touch panel 17071 may include two parts: a touch detection apparatus and a touch controller. The another input device 17072 may include but is not limited to one or more of a physical keyboard, a function key (such as a volume control key or an on/off key), a trackball, a mouse, a joystick, and the like. Details are not described herein. The memory 1709 may be configured to store a software program and various data, including but not limited to an application program and an operating system. The processor 1710 may be integrated with an application processor and a modem processor. The application processor mainly processes an operating system, a user interface, an application program, and the like, and the modem processor mainly processes wireless communication. It may be understood that the modem processor may also not be integrated into the processor 1710.

An embodiment of this application further provides a readable storage medium. A program or an instruction is stored in the readable storage medium. When the program or the instruction is executed by a processor, processes of the embodiment of the display control method can be implemented, and a same technical effect can be achieved. To avoid repetition, details are not described herein.

The processor is a processor in the electronic device in the foregoing embodiment. The readable storage medium includes a computer-readable storage medium such as a read-only memory (Read-Only Memory, ROM), a random access memory (Random Access Memory, RAM), a magnetic disk, an optical disc, or the like.

An embodiment of this application further provides a chip. The chip includes a processor and a communication interface, the communication interface is coupled to the processor, and the processor is configured to run a program or an instruction to implement processes of the embodiment of the display control method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

What is claimed is:

1. A display control method, comprising:
   receiving a fifth input that is performed on N target persons on a photographing preview interface by a user, N is an integer greater than 1;
   displaying N first signs on the photographing preview interface in response to the fifth input, wherein each first sign of the N first signs indicates a target album associated with a target person of the N target persons in a first image, and the first image is a preview image displayed on the photographing preview interface;
   receiving a first input that is performed on one of the N first signs by the user; and
   displaying an album preview interface of the target album in response to the first input; wherein
   the target album comprises at least one second image, and a person in the second image matches the target person.

2. The method according to claim 1, wherein after the displaying the N first signs on the photographing preview interface, the method further comprises:

receiving a sixth input that is performed on P target persons in the N target persons by a user and a seventh input that is performed by a user, wherein the seventh input is used to trigger photographing;

separately photographing each target person in the P target persons in response to the sixth input and the seventh input, and outputting P second target images; and separately storing the P second target images into an album associated with a target person corresponding to each second target image; wherein P is a positive integer, and PEN.

3. The method according to claim 1, wherein after displaying N first signs on the photographing preview interface in response to the fifth input, the method further comprises:

receiving an eighth input that is performed on an $i^{th}$ first sign and a $j^{th}$ first sign in the N first signs by a user;

in response to the eighth input, updating the $i^{th}$ first sign and the $j^{th}$ first sign to a $k^{th}$ first sign, and establishing an association relationship between the $k^{th}$ first sign and a group photo album of the $i^{th}$ target person and the $j^{th}$ target person, wherein the $k^{th}$ first sign is a sign obtained after the $i^{th}$ first sign and the $j^{th}$ first sign are combined, and the $k^{th}$ first sign indicates a group photo album associated with the $i^{th}$ target person and the $j^{th}$ target person;

receiving a ninth input that is performed by a user;

photographing an $i^{th}$ target person and a $j^{th}$ target person according to an indication of the $k^{th}$ first sign in response to the ninth input, and outputting a third target image; and storing the third target image into a group photo album indicated by the $k^{th}$ first sign; wherein i and j are positive integers, the $i^{th}$ first sign and the $j^{th}$ first sign are any two of the N first signs, i≤N, and j≤N.

4. An electronic device, comprising a processor and a memory storing a program or an instruction that is capable of running on the processor, wherein the program or the instruction, when executed by the processor, causes the electronic device to perform:

receiving a fifth input that is performed on N target persons on a photographing preview interface by a user, N is an integer greater than 1;

displaying N first signs on the photographing preview interface in response to the fifth input, wherein each first sign of the N first signs indicates a target album associated with a target person of the N target persons in a first image, and the first image is a preview image displayed on the photographing preview interface;

receiving a first input that is performed on one of the N first signs by the user; and displaying an album preview interface of the target album in response to the first input; wherein the target album comprises at least one second image, and a person in the second image matches the target person.

5. The electronic device according to claim 4, wherein after the displaying the N first signs on the photographing preview interface, the program or the instruction, when executed by the processor, causes the electronic device to further perform:

receiving a sixth input that is performed on P target persons in the N target persons by a user and a seventh input that is performed by a user, wherein the seventh input is used to trigger photographing;

separately photographing each target person in the P target persons in response to the sixth input and the seventh input, and outputting P second target images; and separately storing the P second target images into an album associated with a target person corresponding to each second target image; wherein P is a positive integer, and P≤N.

6. The electronic device according to claim 4, wherein after the displaying N first signs on the photographing preview interface in response to the fifth input, the program or the instruction, when executed by the processor, causes the electronic device to further perform:

receiving an eighth input that is performed on an $i^{th}$ first sign and a $j^{th}$ first sign in the N first signs by a user;

in response to the eighth input, updating the $i^{th}$ first sign and the $j^{th}$ first sign to a $k^{th}$ first sign, and establishing an association relationship between the $k^{th}$ first sign and a group photo album of the $i^{th}$ target person and the $j^{th}$ target person, wherein the $k^{th}$ first sign is a sign obtained after the $i^{th}$ first sign and the $j^{th}$ first sign are combined, and the $k^{th}$ first sign indicates a group photo album associated with the $i^{th}$ target person and the $j^{th}$ target person;

receiving a ninth input that is performed by a user;

photographing an $i^{th}$ target person and a $j^{th}$ target person according to an indication of the $k^{th}$ first sign in response to the ninth input, and outputting a third target image; and storing the third target image into a group photo album indicated by the $k^{th}$ first sign; wherein i and j are positive integers, the $i^{th}$ first sign and the $j^{th}$ first sign are any two of the N first signs, i≤N, and j≤N.

7. A non-transitory readable storage medium storing a program or an instruction, wherein the program or the instruction, when executed by a processor, causes the processor to perform:

receiving a fifth input that is performed on N target persons on a photographing preview interface by a user, N is an integer greater than 1;

displaying N first signs on the photographing preview interface in response to the fifth input, wherein each first sign of the N first signs indicates a target album associated with a target person of the N target persons in a first image, and the first image is a preview image displayed on the photographing preview interface;

receiving a first input that is performed on one of the N first signs by the user; and displaying an album preview interface of the target album in response to the first input; wherein the target album comprises at least one second image, and a person in the second image matches the target person.

8. The non-transitory readable storage medium according to claim 7, wherein the program or the instruction, when executed by the processor, causes the processor to perform following, after the displaying the N first signs on the photographing preview interface:

receiving a sixth input that is performed on P target persons in the N target persons by a user and a seventh input that is performed by a user, wherein the seventh input is used to trigger photographing;

separately photographing each target person in the P target persons in response to the sixth input and the seventh input, and outputting P second target images; and separately storing the P second target images into an album associated with a target person corresponding to each second target image; wherein P is a positive integer, and P≤N.

9. The non-transitory readable storage medium according to claim 7, wherein the program or the instruction, when executed by the processor, causes the processor to perform following, after the displaying N first signs on the photographing preview interface in response to the fifth input:

receiving an eighth input that is performed on an $i^{th}$ first sign and a $j^{th}$ first sign in the N first signs by a user;

in response to the eighth input, updating the $i^{th}$ first sign and the $j^{th}$ first sign to a $k^{th}$ first sign, and establishing an association relationship between the $k^{th}$ first sign and a group photo album of the $i^{th}$ target person and the $j^{th}$ target person, wherein the $k^{th}$ first sign is a sign obtained after the $i^{th}$ first sign and the $j^{th}$ first sign are combined, and the $k^{th}$ first sign indicates a group photo album associated with the $i^{th}$ target person and the $j^{th}$ target person;

receiving a ninth input that is performed by a user;

photographing an $i^{th}$ target person and a $j^{th}$ target person according to an indication of the $k^{th}$ first sign in response to the ninth input, and outputting a third target image; and storing the third target image into a group photo album indicated by the $k^{th}$ first sign; wherein i and j are positive integers, the $i^{th}$ first sign and the $j^{th}$ first sign are any two of the N first signs, i≤N, and j≤N.

* * * * *